US009661565B2

(12) United States Patent
Lee et al.

(10) Patent No.: US 9,661,565 B2
(45) Date of Patent: May 23, 2017

(54) METHOD AND APPARATUS FOR PROVIDING FLOW MOBILITY IN RADIO ACCESS SYSTEM SUPPORTING MULTI-RAT

(75) Inventors: Eunjong Lee, Anyang-si (KR); Youngsoo Yuk, Anyang-si (KR); Heejeong Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 13/878,155

(22) PCT Filed: Oct. 5, 2011

(86) PCT No.: PCT/KR2011/007374
§ 371 (c)(1),
(2), (4) Date: Apr. 5, 2013

(87) PCT Pub. No.: WO2012/047021
PCT Pub. Date: Apr. 12, 2012

(65) Prior Publication Data
US 2013/0201961 A1 Aug. 8, 2013

Related U.S. Application Data

(60) Provisional application No. 61/390,144, filed on Oct. 5, 2010.

(51) Int. Cl.
*H04W 48/18* (2009.01)
*H04W 76/02* (2009.01)
(Continued)

(52) U.S. Cl.
CPC ........... *H04W 48/18* (2013.01); *H04W 36/14* (2013.01); *H04W 48/16* (2013.01);
(Continued)

(58) Field of Classification Search
None
See application file for complete search history.

(56) References Cited

U.S. PATENT DOCUMENTS

2002/0032030 A1* 3/2002 Berglund .............. H04L 1/0003
455/434
2003/0032431 A1* 2/2003 Chang .................. H04W 36/12
455/438

(Continued)

OTHER PUBLICATIONS

Vadada (Telecom Cloud—Migration Stategies for WiMAX 802.16e —Jul. 18, 2010).*

(Continued)

*Primary Examiner* — Marsha D. Banks Harold
*Assistant Examiner* — Christopher Wyllie
(74) *Attorney, Agent, or Firm* — Lee Hong Degerman Kang Waimey

(57) ABSTRACT

A method for a terminal transreceiving data in a radio access system that supports RAT with a first base station that supports a first RAT and a second base station that supports a second RAT, includes the following steps: adding a first service flow through a dynamic service process with the first base station; receiving from the first base station a second system command message for directing connection with the second base station, wherein the second system command message includes either disconnection time information which expresses disconnection time from the first service flow or action time information which expresses the beginning of connection to the first service flow; disconnecting from the first base station and the first service flow, according to the disconnection time information; and transreceiving data pertaining to the first service flow with the second base station.

7 Claims, 14 Drawing Sheets

(51) Int. Cl.
 *H04W 36/14* (2009.01)
 *H04W 48/16* (2009.01)
 *H04W 36/00* (2009.01)
(52) U.S. Cl.
 CPC ...... *H04W 76/025* (2013.01); *H04W 36/0011* (2013.01); *H04W 36/0066* (2013.01); *H04W 76/021* (2013.01)

(56) References Cited

U.S. PATENT DOCUMENTS

| | | | | |
|---|---|---|---|---|
| 2003/0108006 | A1* | 6/2003 | Holcman | H04W 36/0055 370/331 |
| 2004/0147286 | A1* | 7/2004 | Kim | H04W 36/18 455/560 |
| 2005/0113129 | A1* | 5/2005 | Robinson | H04W 36/18 455/524 |
| 2005/0283447 | A1* | 12/2005 | Xu | G06Q 30/0283 705/400 |
| 2006/0023683 | A1* | 2/2006 | Lee | H04W 36/0011 370/338 |
| 2006/0039329 | A1* | 2/2006 | Samuel | H04W 48/08 370/335 |
| 2006/0129630 | A1* | 6/2006 | Catalina-Gallego | H04L 29/12311 709/203 |
| 2006/0148479 | A1* | 7/2006 | Park | H04W 36/026 455/437 |
| 2007/0224989 | A1* | 9/2007 | Soong | H04W 36/18 455/436 |
| 2008/0101300 | A1* | 5/2008 | Oh | H04W 36/0011 370/332 |
| 2008/0109693 | A1* | 5/2008 | Maas | H04L 1/1812 714/748 |
| 2008/0137630 | A1* | 6/2008 | Park | H04L 29/12283 370/338 |
| 2009/0180451 | A1 | 7/2009 | Alpert et al. | |
| 2010/0087196 | A1* | 4/2010 | Lee | H04W 60/06 455/436 |
| 2010/0130207 | A1* | 5/2010 | Wu | H04W 36/0066 455/436 |
| 2011/0026503 | A1* | 2/2011 | Mueck | H04W 48/10 370/338 |
| 2011/0134869 | A1* | 6/2011 | Hirano | H04L 29/12311 370/329 |
| 2013/0201961 | A1* | 8/2013 | Lee | H04W 48/18 370/331 |

OTHER PUBLICATIONS

Vadada (Telecom Cloud—Migration Stategies for WiMAX 802.16e—Jul. 18, 2010).*

Ferrus, et al., "Interworking in Heterogeneous Wireless Networks: Comprehensive Framework and Future Trends", IEEE Wireless Communications, Apr. 2010, 10 pages.

Kim, et al., "Contribution for Hierarchical Network Study Report", IEEE 802.16 Broadband Wireless Access Working Group, IEEE C802.16ppc-10/0044, Jul. 2010, 9 pages.

Kim, et al., "Study Report on Hierarchical Networks (Working document)", IEEE 802.16 Broadband Wireless Access Working Group, IEEE 802.16ppc-10/0008, Jul. 2010, 15 pages (relevant sections: 2.2 and 3).

* cited by examiner

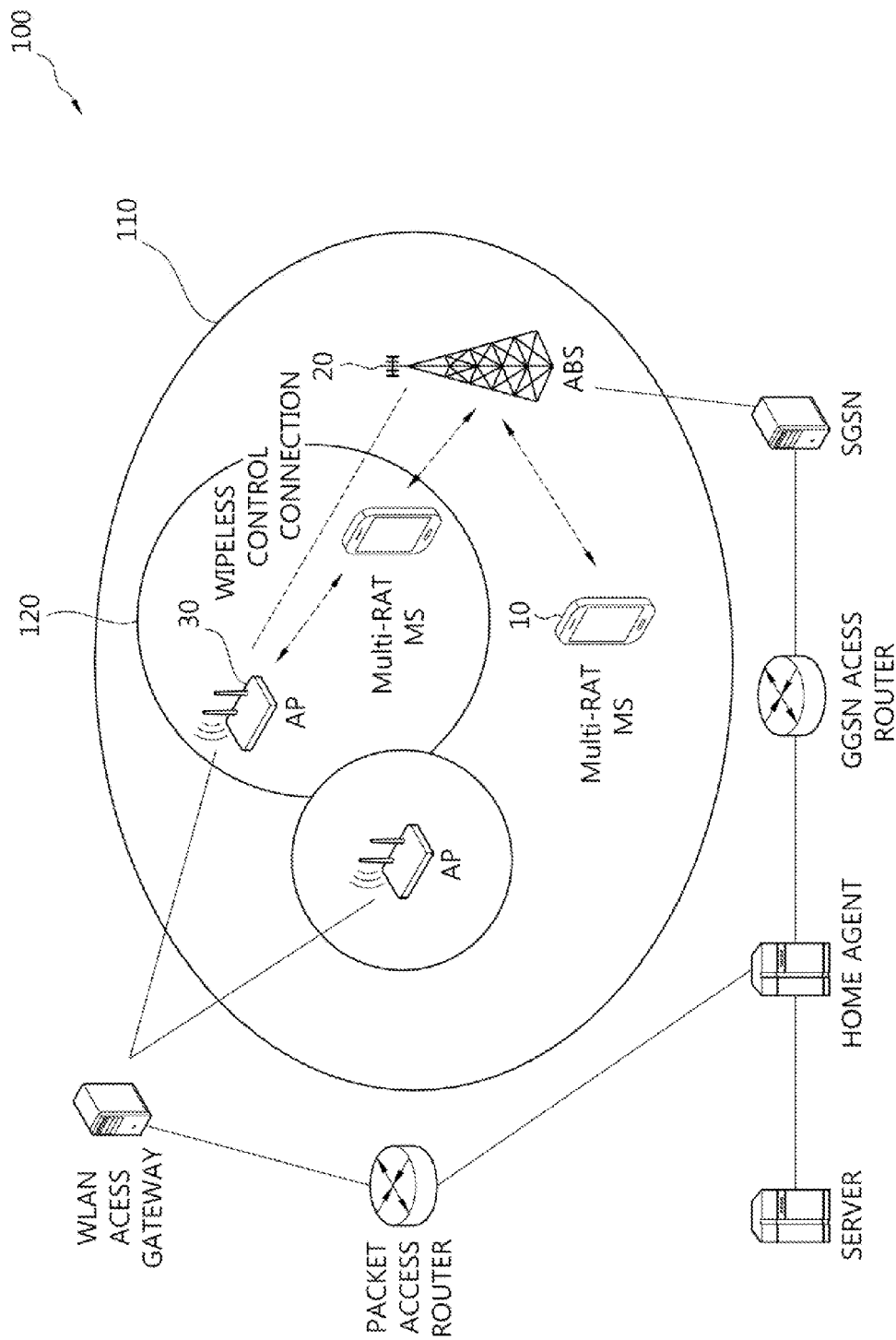

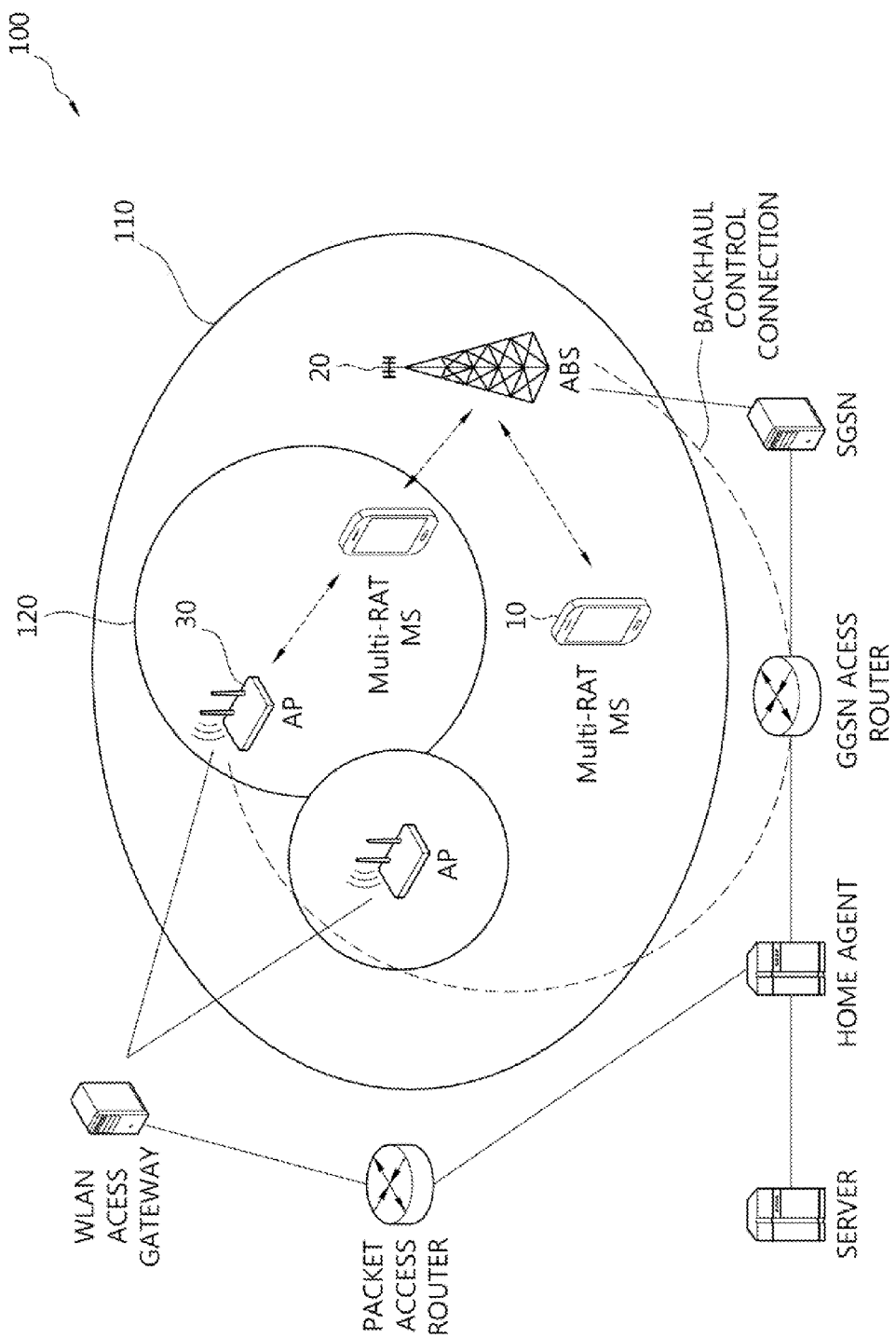

METHOD AND APPARATUS FOR PROVIDING FLOW MOBILITY IN RADIO ACCESS SYSTEM SUPPORTING MULTI-RAT

CROSS-REFERENCE TO RELATED APPLICATIONS

This application is the National Stage filing under 35 U.S.C. 371 of International Application No. PCT/KR2011/007374, filed on Oct. 5, 2011, which claims the benefit of U.S. Provisional Application Ser. No. 61/390,144, filed on Oct. 5, 2010, the contents of which are all hereby incorporated by reference herein in their entirety.

BACKGROUND OF THE INVENTION

Field of the Invention

The present invention relates to a radio access system supporting multi-radio access technology (RAT) and, more particularly, to a method and the apparatus for transmitting and receiving data over two or more heterogeneous networks.

Related Art

In a conventional radio communication environment supporting two or more heterogeneous networks, although a terminal has capabilities to access multi-RAT, the terminal is unable to access the multi-RAT at the same time and transmit and receive data to and from the two or more heterogeneous networks at the same time.

That is, a conventional terminal supporting multi-RAT accesses any one RAT based on switching and transmits and receives data over one network. Accordingly, if a terminal having multi-RAT capabilities transmits and receives data over a specific network and transmits and receives data over a network different from the specific network, the transmission and reception of data over any one network is stopped.

Accordingly, in the prior art, a terminal having capabilities supporting two or more heterogeneous networks is able to perform communication by using different networks, but efficiency is limited because the terminal operates based on simple switching.

Furthermore, since different networks independently operate, an inefficient operation is performed from a viewpoint of the overall flow management of a terminal. In particular, there is a need for a method of providing the flow mobility of data being transmitted between heterogeneous networks.

SUMMARY OF THE INVENTION

The present invention is for proposing a method of providing flow mobility if RAT is changed when a terminal supporting a multi-RAT function transmits and receives data in a broadband radio communication system.

Particularly, the present invention is for proposing a method of indicating the time when the transmission and reception of data corresponding to a specific flow is stopped and the time when the transmission and reception of data corresponding to a specific flow is started in response to a control signal from a primary system when the terminal supports a multi-RAT function capable of accessing a primary system and a secondary system corresponding to different RAT from the primary system.

Furthermore, the present invention is for proposing a method in which the terminal supporting a multi-RAT function stops and starts the transmission and reception of data so that flow mobility is guaranteed while performing operations, such as association, disassociation, and re-association, with the secondary system.

In an aspect, a method of transmitting and receiving, by a terminal, data to and from a first base station supporting first radio access technology (RAT) and a second base station supporting second RAT in a radio access system supporting multi-RAT is provided. The method includes adding a first service flow through a dynamic service process with the first base station, transmitting and receiving data, corresponding to the added first service flow, to and from the first base station, receiving a secondary system command message, instructing association with the second base station, from the first base station, the secondary system command message including at least one of disconnection time information indicating disconnection time for the first service flow and action time information indicating beginning time of association for the first service flow, releasing association with the first base station for the first service flow based on the disconnection time information, performing an association procedure with the second base station, and transmitting and receiving the data corresponding to the first service flow to and from the second base station.

The aspect of the present invention or other aspects of the present invention may include any one of the following features.

The data corresponding to the first service flow may be transmitted to and received from the second base station based on the action time information. The method may further include transmitting a secondary system indication message, indicating a success of the association with the second base station, to the first base station.

The method may further include receiving a secondary system command message, instructing disassociation with the second base station, from the first base station, releasing the association with the second base station based on the disconnection time information, and transmitting and receiving the data corresponding to the first service flow to and from the first base station. The method may further include transmitting a secondary system indication message, indicating the disassociation with the second base station, to the first base station.

The method may further include receiving a secondary system command message, instructing re-association with another second base station other than the second base station, releasing the association with the second base station based on the disconnection time information, performing an association procedure with the another second base station based on the action time information, and transmitting and receiving the data corresponding to the first service flow to and from the another second base station. The method may further include transmitting a secondary system indication message, indicating a success of the association with the another second base station, to the first base station. The method may further include transmitting a scan report message, reporting a result of scanning on the another second base station, to the first base station.

In another aspect, a terminal for transmitting and receiving data to and from a first base station supporting first radio access technology (RAT) and a second base station supporting second RAT in a radio access system supporting multi-RAT is provided. The terminal includes a radio communication unit for transmitting and receiving radio signals to and from an outside, and a control unit connected to the radio communication unit, and configured for adding a first service flow through a dynamic service process with the first base station, controlling the radio communication unit for transmitting and receiving data, corresponding to the added first service flow, to and from the first base station, controlling the radio communication unit for receiving a secondary system command message, instructing association with the second base station, from the first base station, releasing association with the first base station for the first service flow based on the disconnection time information, performing an association procedure with the second base station, and controlling the radio communication unit for transmitting and receiving the data corresponding to the first service flow to and from the second base station. The secondary system command message includes at least one of disconnection time information indicating disconnection time for the first service flow and action time information indicating beginning time of association for the first service flow.

Data can be transmitted and received seamlessly even when RAT is changed when an MS supporting a multi-RAT function according to embodiments of the present invention transmits and receives data.

BRIEF DESCRIPTION OF THE DRAWINGS

FIGS. 1(a) and 1(b) are conceptual diagrams showing a multi-RAT network to which an embodiment of the present invention can be applied.

DESCRIPTION OF EXEMPLARY EMBODIMENTS

Figure 2:
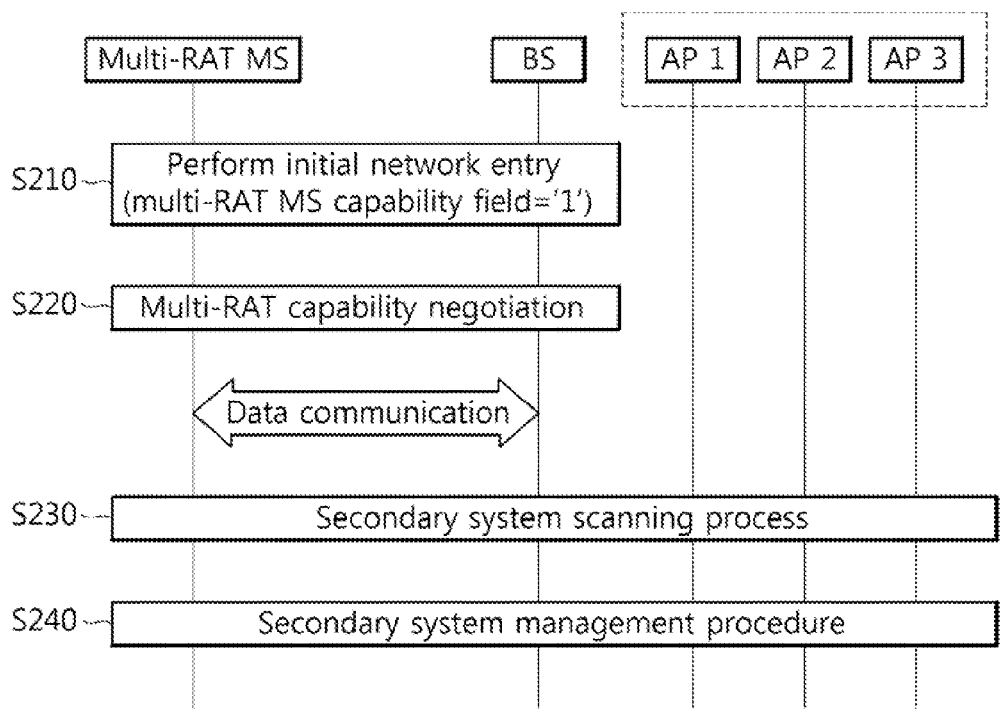
FIG. 2 is a flowchart showing a method of the multi-RAT MS transmitting and receiving data through the primary system and the secondary system.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like.

The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

A method in which an MS accesses two or more heterogeneous networks (or multi-RAT) and transmits and receives data over the networks at the same time in a multi-RAT network according to an embodiment of the present invention is described below.

At first, a multi-radio access technology (multi-RAT) network according to an embodiment of the present invention is described.

FIGS. 1(*a*) and 1(*b*) are conceptual diagrams showing a multi-RAT network to which an embodiment of the present invention can be applied.

A multi-radio access technology (hereinafter referred to as 'multi-RAT') network refers to a radio communication environment in which two or more heterogeneous networks are present and an MS is able to access two or more heterogeneous networks and perform communication at the same time.

Here, an MS capable of performing communication with the two or more heterogeneous networks at the same time is called a 'multi-RAT MS' or 'a multi-system MS'.

A heterogeneous network (or a heterogeneous system) refers to a network using a communication method different from a communication method used in a specific network on the basis of the specific network.

For example, a WiMAX network, that is an example of a mobile communication system, and a Wi-Fi network using a Wi-Fi network, correspond to heterogeneous networks.

RAT is a technique type used in radio access. For example, RAT can include a GSM/EDGE radio access network (GERAN), a UMTS terrestrial radio access network (UTRAN), an evolved-UMTS terrestrial radio access network (E-UTRAN), WiMAX, LTE (-A), and Wi-Fi. That is, a GERAN, a UTRAN, an E-UTRAN, WiMAX, and/or Wi-Fi are mixed in the same area.

As shown in FIG. 1, a multi-RAT network 100 can include a primary system 110 and a secondary system 120.

Here, the primary system 110 and the secondary system 120 can be represented by a first network and a second network, respectively. The primary system 110 can include a multi-RAT MS 10, a base station 20, and the secondary system 120, and the secondary system 120 can include the multi-RAT MS 10 and an AP 30.

The primary system is a system having a wide range of coverage and can be a mobile communication system. For example, the primary system can be a WiMAX or LTE (-A) system. Furthermore, the primary system refers to a system always having a status with the multi-RAT MS. That is, the primary system refers to a system which maintains an activation state, a sleep mode state, or an idle mode state with the multi-RAT MS.

The secondary system is a system having a small range of coverage and can be a WLAN communication system. For example, the secondary system can be a Wi-Fi system. That is, the secondary system refers to a system that can be added to or deleted from the multi-RAT network if necessary. Furthermore, the secondary system can be used for the transmission and reception of data which basically requires a higher bandwidth (BW). Accordingly, a specific flow (QoS) can be mapped for the use of the secondary system.

Here, a base station of the secondary system, for example, an access point (AP) can operate like an MS having capabilities capable of communicating with the primary system.

Furthermore, in a multi-RAT network, the primary system and the secondary system are associated with each other in a wired or wireless manner. That is, a base station in the primary system and a base station in the secondary system can be associated with each other over a backbone network (FIG. 1(*b*)) can be associated with each other wirelessly (FIG. 1(*a*)).

Hereinafter, it is assumed that the primary system is a WiMAX system and a secondary system is a Wi-Fi system unless otherwise described, for convenience of description. Accordingly, a base station corresponding to the primary system is called a 'base station', and a base station corresponding to the secondary system is called an 'AP'. Furthermore, access to the primary system can be used as the same meaning as access to the base station, and access to the secondary system can be used as the same meaning as access to the AP.

FIG. 2 is a flowchart showing a method of the multi-RAT MS transmitting and receiving data through the primary system and the secondary system.

Referring to FIG. 2, the multi-RAT MS performs an initial network entry process with the base station (S210).

The multi-RAT MS sends an indicator, indicating that the multi-RAT MS is an MS supporting multi-RAT, to the base station through the initial entry process with the base station. Here, the indicator can be a multi-RAT MS capability field. Furthermore, the indicator, that is, the multi-RAT MS capability field, can have a size of one bit.

Furthermore, the indicator can be transmitted through a registration procedure performed during the initial network entry process with the base station. In this case, the indicator can be transmitted to the base station through a registration request or registration response (REG-REQ/RSP) message.

For example, when the indicator is set to '1', it indicates that an MS is an MS supporting multi-RAT. When the indicator is set to '0', it indicates that an MS is an MS not supporting multi-RAT.

Furthermore, when an REG-REQ message or an REG-RSP message including the indicator (e.g., set to '1') indicative of capabilities supporting multi-RAT is received from the multi-RAT MS, the base station may send information, notifying that an additional multi-RAT capability negotiation process for supporting the multi-RAT MS will be performed, to the multi-RAT MS after the initial network entry process is finished or after a lapse of some time.

For example, when the notification information is set to '1', it indicates that the base station and the multi-RAT MS perform an additional capability negotiation process in order to support multi-RAT. When the notification information is set to '0', it indicates that an additional capability negotiation process does not need to be performed.

Next, if the multi-RAT MS finishes the initial network entry process with the base station, the multi-RAT MS and the base station perform a multi-RAT capability negotiation process (S220). Here, the multi-RAT capability negotiation process is commonly performed after a network (re)entry process is finished, but can be performed during a network (re)entry process with the base station.

For example, if the multi-RAT capability negotiation process is performed during the network (re)entry process, the multi-RAT MS and the base station can perform the multi-RAT capability negotiation process through the registration procedure process of the base station and the multi-RAT MS. In this case, the multi-RAT MS and the base station transmit and receive pieces of information regarding a multi-RAT capability negotiation through REG-REQ/REG-RSP messages.

The multi-RAT capability negotiation process of the multi-RAT MS and the primary system are described in more detail later with reference to FIG. 3.

Next, the multi-RAT MS performs an AP scanning process for access to the secondary system based on information related to the secondary system received from the base station (S230).

Here, the multi-RAT MS performs a scanning process on neighbor APs periodically or in an event-triggered way for access to the secondary system.

First, it is assumed that association with all data transmitted to the multi-RAT MS is performed through a dynamic service (DSx) procedure with the base station of the primary system and communication with the secondary system of the multi-RAT MS sends data regarding a specific flow to the secondary system under the determination of the base station of the primary system.

It is also assumed that the scanning of the secondary system of the multi-RAT MS on the APs is performed under the instruction of the base station of the secondary system. This is for the power saving of the multi-RAT MS.

The AP scanning process of the multi-RAT MS for access to the secondary system can be performed through a process of receiving a multi-RAT scan command message from the base station, performing the scanning based on the received multi-RAT scan command message, and sending a multi-RAT scan report message for reporting a result of the executed scanning to the base station.

The scanning process for access to the secondary system of the multi-RAT MS is described in detail later with reference to FIG. 4.

Next, the multi-RAT MS performs a management (or operation) procedure with the secondary system (S240). Here, the management procedure with the secondary system refers to processes, such as association, disassociation, and re-association with the secondary system of the multi-RAT MS. Here, the management procedure of the secondary system is controlled by the primary system.

After performing the association procedure with the secondary system, the multi-RAT MS transmit and receive data through the AP of the secondary system.

Here, in order to access the secondary system, the multi-RAT MS has to receive an acknowledgement response for the access to the secondary system from the primary system.

That is, as described above, the base station selects an AP that the multi-RAT MS accesses and checks the state of the selected AP before the multi-RAT MS sends the acknowledgement response to the access to the secondary system to the multi-RAT MS. If, as a result of the check, the access to the selected AP is possible, the base station can send information about the multi-RAT MS to the selected AP in advance.

Furthermore, when the base station sends a command message to the multi-RAT MS, the based station can also send information that is necessary or useful for the multi-RAT MS to access the AP.

For example, the necessary or useful information can be an SSID, the MAC address of the AP, WEP key, or channel number (or frequency information), the protocol version (11a/b/n . . . ) of the AP, and offset information between a beacon and the frames of the base station (a relative location of the beacon is indicated by a difference with a specific frame time and transmitted).

Furthermore, if the multi-RAT MS recognizes that the multi-RAT MS has entered the coverage of the secondary system as a result of the executed scanning on the AP for the access to the secondary system, the multi-RAT MS may request access to the secondary system to the base station of the primary system.

A message necessary for the management procedure of the secondary system can include the following messages.

1. A secondary system request (SS_REQ) message
   : is used for the multi-RAT MS to request access to the AP.
2. A secondary system command (SS_CMD) message
   : is a message used to manage access to the AP and is used for association, disassociation, or re-association with or from the AP.
3. A secondary system indication (SS_IND) message
   : is a message used as a response to the secondary system command message and is used for the multi-RAT MS to inform the base station of an association success, a disassociation success, or a re-association success with the AP.

Next, if the access to the AP of the secondary system is successful, the multi-RAT MS is able to transmit and receive data to and from the primary system and transmit and receive data to and from the secondary system at the same time. Here, the data transmitted and received to and from the multi-RAT MS through the AP is controlled by the primary system.

A multi-RAT capability negotiation process between the multi-RAT MS and the base station is described in detail below.

Figure 3:
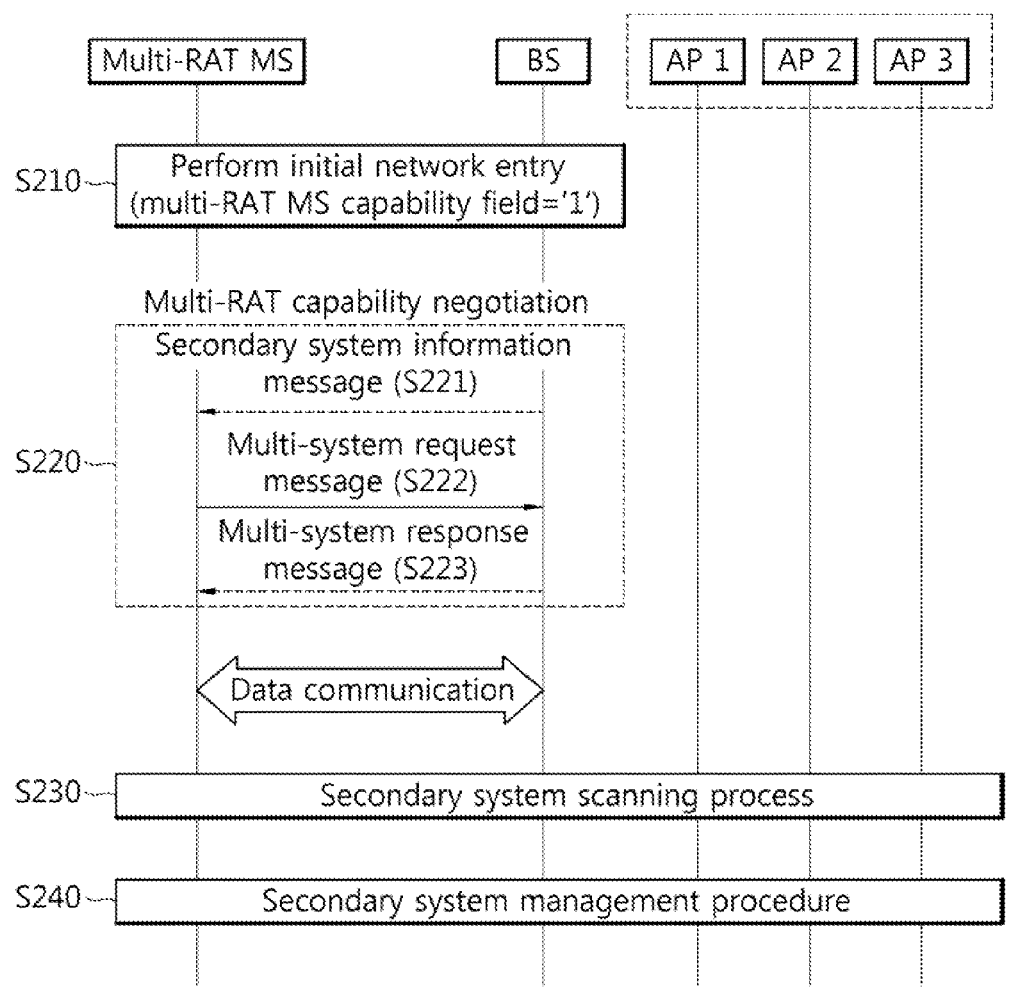
FIG. 3 is a flowchart showing a multi-RAT capability negotiation process between the multi-RAT MS and the primary system.

FIG. 3 is a flowchart showing a multi-RAT capability negotiation process between the multi-RAT MS and the primary system.

S210 and S230~S240 are the same as the contents of FIG. 2, thus a description thereof is omitted, and only a step S220 is described in detail below.

As described above, the multi-RAT capability negotiation process between the multi-RAT MS and the base station is performed after network (re)entry.

Here, in the case of the network re-entry, the multi-RAT capability negotiation process can be omitted. This is because to perform the same procedure already performed when the multi-RAT MS re-enters the same system over a network generates an unnecessary overhead because capability negotiations for multi-RAT have already been performed through the initial network entry procedure between the multi-RAT MS and the base station.

Furthermore, in the case of a handover (HO), a target base station of the primary system can perform multi-RAT capability negotiations with the multi-RAT MS in advance over a backbone network from the serving base station of the primary system.

A process of the multi-RAT MS performing the multi-RAT capability negotiation process with the primary system can be as follows.

First, the base station can send information related to the secondary system to the multi-RAT MS (S221). That is, if the base station has common information about the APs of the secondary system that have to be received by the multi-RAT MS, the base station can send the AP information to the multi-RAT MS in a broadcast or unicast way.

Here, the information related to the secondary system refers to information about a heterogeneous system that belongs to the same coverage as the primary system. Here, the multi-RAT MS may not need to know all secondary systems included in the primary system and information related to the secondary systems. In this case, the base station does not send all pieces of information about the secondary systems and related to the secondary systems, but can send a list of pieces of information related to (necessary for) the multi-RAT MS to the multi-RAT MS in a unicast way. In this case, the list can be transmitted in the multi-RAT capability negotiation process.

Next, the multi-RAT MS sends a multi-system capability request message to the base station (S222). The multi-system capability request message can include, for example, the 802.11 MAC address of the MS, existing access AP information, and protocol version information of 802.11. The 802.11MAC address is necessary for authentication information. If the existing access AP information is included in the multi-system capability request message, the multi-system capability request message is transmitted to only a base station to which the existing access AP belongs.

Next, the base station sends a multi-system capability response message to the multi-RAT MS in response to the multi-system capability request message (S223).

The multi-system capability response message can include information about candidate APs.

Furthermore, if the multi-RAT MS enters idle mode, the base station can store information, obtained through the multi-RAT capability negotiation process with the multi-RAT MS, for a certain time. That is, the base station can newly define a multi-RAT information maintenance timer, can store the obtained information until the multi-RAT information maintenance timer expires, and can discard the obtained information after the timer expires.

Accordingly, if the multi-RAT MS performs network re-entry into the base station before the multi-RAT information maintenance timer expires, the multi-RAT capability negotiation process can be omitted.

A scanning process on the secondary system of the multi-RAT MS is described in detail below.

Figure 4:
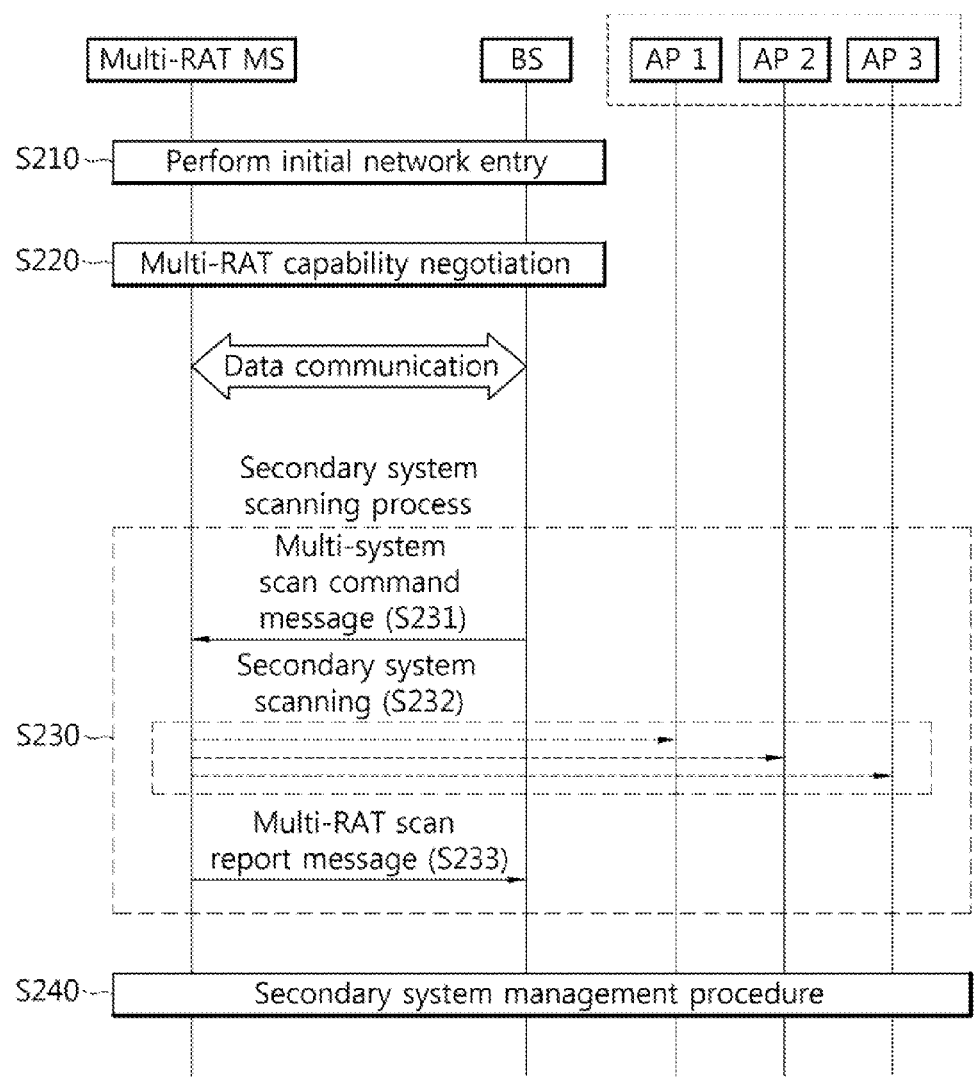
FIG. 4 is a flowchart showing the multi-RAT MS performing a scanning process on the secondary system according to an embodiment of the present invention.

FIG. 4 is a flowchart showing the multi-RAT MS performing a scanning process on the secondary system according to an embodiment of the present invention.

S210~S220 and S240 are the same as the contents of FIG. 2, thus a description thereof is omitted, and only a step S230 is described in detail below.

First, if the base station determines to communicate a specific data flow by using Wi-Fi, the base station instructs the multi-RAT MS to perform scanning on neighbor APs.

That is, the base station sends a multi-RAT scan command message (multi-RAT_SCN-CMD) to the multi-RAT MS (S231). In this case, the multi-RAT scan command message can include the SSIDs of the neighbor APs, a beacon transmission period, and scanning interval information so that the multi-RAT MS can rapidly detect the neighbor APs.

Here, the scanning of the multi-RAT MS may not be performed in response to an instruction of the base station as described above, but the multi-RAT MS may directly request scanning for access to the secondary system to the base station of the primary system. In this case, the multi-RAT MS and the base station can perform scanning on the neighbor APs through probe request/response transmission/reception processes.

Here, the multi-RAT MS performs the scanning for access to the secondary system even in a process for transmitting and receiving data with the base station of the primary system. In this case, the multi-RAT MS may indicate only an SCN-REP transmission method through the SCN-CMD message without setting a scanning interval with the base station.

That is, if the multi-RAT scan command message is received from the base station, the multi-RAT MS performs scanning on APs neighbor to the multi-RAT MS based on information included in the received multi-RAT scan command message (S232). Here, the neighbor APs of the multi-RAT MS can be the APs of the secondary system within the coverage of the base station of the primary system.

Next, the multi-RAT MS sends a multi-RAT scan report (SCN-REP) message to the base station of the primary system (S233). That is, the multi-RAT MS sends a result of the scanning into detected APs to the base station. In this case, the multi-RAT MS can also send the received signal strength indicator (RSSI) of each AP or information about APs preferred by the multi-RAT MS.

For example, if scan report mode within a multi-RAT scan command message most recently received from the base station is set to '0b10', the multi-RAT MS can send the multi-RAT scan report message to the base station in an event-triggered way.

In this case, if a scan report trigger condition is satisfied, the multi-RAT MS sends the multi-RAT scan report message to the base station.

For another example, the multi-RAT MS can report a scan result to the base station on a time defined in the multi-RAT scan command message other than a scanning interval for a periodic scan report (e.g., when report mode is set to '0b01') or for one scan report (e.g., when report mode is set to '0b11').

Furthermore, if the multi-RAT MS periodically sends a scan report to the base station, the multi-RAT MS can stop a report on scanning results for an AP after all scanning intervals within the multi-RAT scan command message.

Furthermore, the multi-RAT scan report message includes all available scanning results for requested APs defined in the multi-RAT scan command message.

In order to report a scanning result to the base station anytime or to receive a multi-RAT-neighbor advertising message having system information about a requested system and optionally system information about other RATs in which the base station is determined to be neighbor to the multi-RAT MS from the base station in a unicast way, the multi-RAT MS can send the multi-RAT scan report message to the base station.

Furthermore, the multi-RAT MS can instruct the base station to filter a list of neighbor secondary systems based on a requested radio type by including a neighbor request RAT type indicator and/or SSIDs (or BSSID or a MAC address) in the scan report message.

Next, if scanning results for a plurality of APs are received from the multi-RAT MS, that is, the multi-RAT scan report message is received, the base station can select an optimum system, that is, an AP, by taking the same operator, the priority of an MS, channel quality, load balancing, or transmitted traffic into consideration and inform the multi-RAT MS of the selected optimum system.

As another embodiment, in order to perform a scanning process on the secondary system, the multi-RAT MS can use existing transmitted and received messages instead of the multi-RAT scan command/report message defined above. Here, if the multi-RAT MS performs scanning on the secondary system by using the existing message, the existing message includes information indicating that the scanning of the multi-RAT MS is for transmitting and receiving data by using a multi-RAT system. That is, a target to be scanned by the multi-RAT MS can be indicated by newly defining a field capable of indicating the SSID, BSSID, or MAC address of a target system.

After performing the association procedure with the secondary system, the multi-RAT MS transmits and receives data to and from the secondary system. Here, association, disassociation, and re-association with the secondary system correspond to the operation (or management) process of the secondary system. Furthermore, the primary system controls the operation of the secondary system.

Here, in order to access the secondary system, the multi-RAT MS has to receive an acknowledgement response to the access to the secondary system from the primary system.

That is, as described above, the base station selects an AP that the multi-RAT MS will access and checks the state of the selected AP before the multi-RAT MS sends an acknowledgement response to the access to the secondary system. If, as a result of the check, the access to the selected AP is possible, the base station sends information about the multi-RAT MS to the selected AP in advance.

Furthermore, when the base station sends an acknowledgement response to the multi-RAT MS, the base station can also send information that is necessary or useful for the multi-RAT MS to access the AP.

For example, the necessary or useful information can be an SSID, the MAC address of the AP, WEP key, or channel number (or frequency information), the protocol version (11a/b/n . . . ) of the AP, and offset information between a beacon and the frames of the base station (a relative location of the beacon is indicated by a difference with a specific frame time and transmitted).

Furthermore, if the multi-RAT MS recognizes that the multi-RAT MS has entered the coverage of the secondary system as a result of executed scanning on the AP for the access to the secondary system, the multi-RAT MS may request access to the secondary system to the base station of the primary system.

An operation (or management) method of the secondary system is described in detail below. Here, the operation of the secondary system refers to association or disassociation between the secondary system and the multi-RAT MS and re-association between the multi-RAT MS and the secondary system, and the operation of the secondary system is controlled by the base station, that is, the primary system.

As an example of the operation method of the secondary system, a process of the multi-RAT MS accessing (or associating with) the secondary system, that is, a process of the multi-RAT MS adding the secondary system and transmitting and receiving data to and from the primary system and the secondary system at the same time, is described with reference to FIG. 5.

Figure 5:
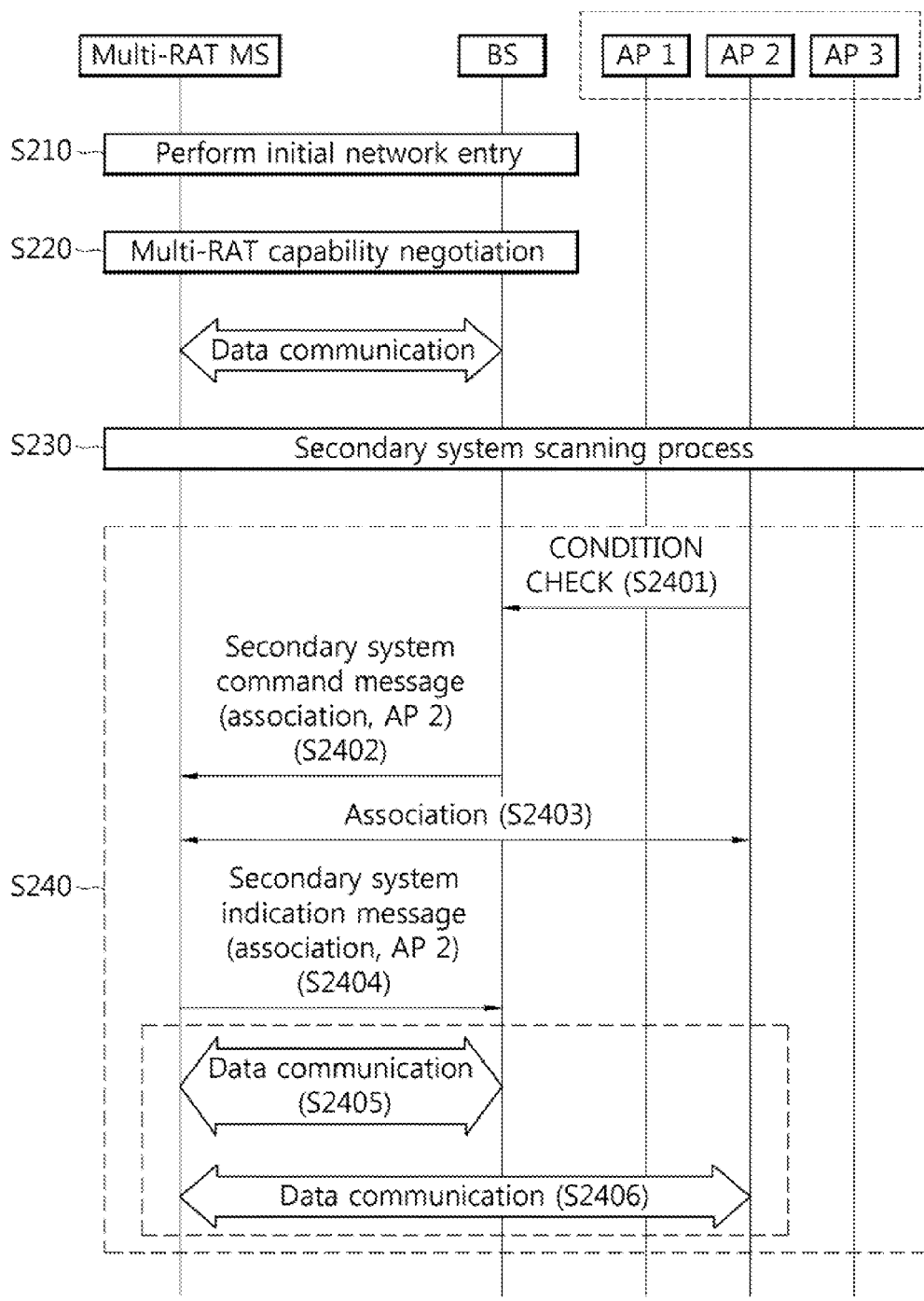
FIG. 5 is a flowchart showing a process of adding the secondary system, that is, a process of a multi-RAT MS accessing the secondary system, in an operation method of the secondary system according to an embodiment of the present invention.

FIG. 5 is a flowchart showing a process of adding the secondary system, that is, a process of a multi-RAT MS accessing the secondary system, in an operation method of the secondary system according to an embodiment of the present invention.

S210~S230 are the same as the contents of FIG. 2, thus a description thereof is omitted, and only a step S240 is described in detail below.

In order to access the secondary system, the multi-RAT MS or the base station can perform a multi-RAT association request. In this case, the multi-RAT MS or the base station can perform a multi-RAT association request process through a secondary system association request/response message.

If a secondary system is added at the request of the multi-RAT MS, when the multi-RAT MS detects the secondary system satisfying a specific condition by performing scanning, the multi-RAT MS can request association with the secondary system to the base station by sending a secondary system request message to the base station.

Furthermore, if a secondary system is added at the request of the base station, when the base station detects that specific flow association is generated in the multi-RAT MS, the base station checks the state of an AP that can be accessed to the multi-RAT MS (S2401).

If, as a result of the check, access to the multi-RAT MS is possible, the base station can instruct association between the multi-RAT MS and the secondary system by sending a secondary system access command message to the multi-RAT MS (S2402).

Here, control of the multi-RAT MS for accessing multi-RAT, that is, the transmission of control information, is performed by the base station of the primary system. In this case, QoS for corresponding data has only to comply with a method supported by a primary system because the multi-RAT MS simply performs data transmission and reception with the secondary system. In this case, the transmission of the control information can be performed through the secondary system access command message.

Here, the secondary system access command message can include information about a selected AP, information about a flow transmitted to the secondary system, and an authentication method (an open system or a shared key). From FIG. 5, it can be seen that information about a selected AP is an AP 2.

Next, the multi-RAT MS completes access to a specific AP and a traffic stream (TS) configuration with reference to AP information within the secondary system command message in response to an access command of the secondary system of the base station (S2403). For example, an ADDTS request/response process of 802.11e can be performed.

Next, the multi-RAT MS informs the base station of a result of an association success for the specific AP (S2404).

From FIG. 5, it can be seen that the multi-RAT MS informs the base station of the association success for the AP 2.

In this case, the association success can be performed through a secondary system indication (SS_IND) message. The secondary system indication message can include a result of the mapping of a flow ID (FID) and an association ID (AID)/traffic stream ID (TSID) for a corresponding flow.

Next, the multi-RAT MS transmits and receives data for a specific flow through the secondary system. That is, the multi-RAT MS transmits and receives data to and from the primary system and the secondary system at the same time according to a data flow (S2405 and S2406).

That is, in the case of DL data, the base station sends the DL data to the multi-RAT MS through the AP.

Furthermore, in the case of UL data, data for a specific flow ID indicated by the base station is transmitted through the secondary system, for example, over a WLAN.

Furthermore, the multi-RAT MS can perform re-association or disassociation with the AP by transmitting and receiving the secondary system command/indication messages to and from the base station.

Furthermore, if the multi-RAT MS gets out of the secondary system, for example, a WLAN coverage while transmitting and receiving data to and from the AP and there is no neighbor AP nearby, the base station can control seamless flow mobility between the AP and the base station so that the data transmitted to and received from the AP is seamlessly transmitted through the base station of the primary system.

Furthermore, if the multi-RAT MS detects a neighbor AP while transmitting and receiving data to and from the AP of the secondary system, the base station can perform control so that the data now being transmitted to and received from the multi-RAT MS is seamlessly transmitted from the AP to the neighbor AP.

A method of releasing (or dissociating) the secondary system is described below.

If the multi-RAT MS determines that a channel state with the secondary system now being accessed thereto is not good, the multi-RAT MS performs scanning on neighbor secondary systems. Here, as described above, the scanning can be performed in response to an instruction of the base station, or the multi-RAT MS can perform the scanning autonomously.

If the multi-RAT MS determines that there is no detected secondary system as a result of the scanning into the neighbor secondary systems, the multi-RAT MS dissociates the secondary system now being accessed thereto.

In this case, if data corresponding to a specific flow of the primary system is being transmitted and received through the secondary system and the MS is unable to perform an HO to a neighbor AP secondary system, the base station has to support multi-RAT seamless flow mobility so that seamless flow mobility can be performed without a data loss for the corresponding flow.

Or, in this case, when the multi-RAT MS completes the transmission of data transmitted to and received from the secondary system, the base station can release association with the secondary system.

The re-association (e.g., a handover to a neighbor AP) of the secondary system is described below.

Here, it may be assumed that the re-association of the secondary system, that is, a handover between secondary systems, is performed on only specific association.

Here, the re-association of the secondary system, that is, a handover between the secondary systems, is seamlessly performed through the primary system.

If the multi-RAT MS determines that the channel state of the secondary system now being accessed thereto is not good, the multi-RAT MS or the base station can release association with the secondary system now being accessed thereto and request a handover (HO) to another secondary system.

That is, the base station informs the multi-RAT MS that there is no longer data transmitted and received through a current serving secondary system by sending an SS-CMD message to the multi-RAT MS. Next, the base station instructs the multi-RAT MS to transmit and receive existing transmitted data through the primary system. If the transmission of the existing data is completed, the base station instructs the multi-RAT MS to transmit and receive data to and from a new secondary system. That is, a seamless handover between the secondary systems can be performed through the primary system.

Furthermore, when the multi-RAT MS performs a handover between primary systems, if the coverage of the secondary system is located at the boundary of the primary systems, the multi-RAT MS can perform a handover between the primary systems seamlessly by using the secondary system.

Furthermore, if the multi-RAT MS moves within the primary system, for example, WiMAX coverage at high moving speed, the base station can instruct the multi-RAT MS not to perform association with the secondary system although the multi-RAT MS has entered the coverage of the secondary system. That is, this management of the secondary system can be performed based on the speed of the multi-RAT MS.

A method of sending data, transmitted through RAT with which association is now set up, to another RAT seamlessly in a radio access system according to embodiments of the present invention is disclosed.

A radio access system according to embodiments of the present invention can use a disconnection time or an activation time in order to support seamless data transfer. The disconnection time indicates the time when the transmission and reception of data corresponding to a specific flow, from among data transmitted and received through RAT with which association has been set up, is ended. The activation time indicates the time when data corresponding to a specific flow, from among data transmitted and received through previous RAT, is transmitted and received through new RAT.

The disconnection time or the activation time can be transmitted from the base station to the multi-RAT MS through a secondary system command (SS_CMD) message.

The base station can use the disconnection time or the activation time along with a management message transmitted through the secondary system command message. According to the secondary system command message received from the base station, the multi-RAT MS performs an association, disassociation or re-association process with or from a specific AP or completes a TS setup process. In this case, the secondary system command message can include information about the disconnection time or the activation time along with a selected AP and information about a flow to be transmitted to the secondary system or an authentication method.

In response to the secondary system command message, the multi-RAT MS sends a result of the execution of the command to the base station through a secondary system indication (SS_ND) message. Accordingly, the activation time can be set to a value after the time that is enough for the secondary system indication message to be transmitted to the base station so that the multi-RAT MS that has executed the command in response to the secondary system command message can send the secondary system indication message.

Examples in which the disconnection time is used along with each management message are disclosed.

First, if the disconnection time is used along with a management message for association with the secondary system, the disconnection time means the time when association with the system to and from which data is now transmitted and received in relation to a specific flow is released. The multi-RAT MS can initiate an association process with the secondary system according to the secondary system command message after the disconnection time unless instructed otherwise.

Furthermore, if the disconnection time is used along with a management message for disassociation from the secondary system, the disconnection time means the time when association with the secondary system to and from which data is now transmitted and received in relation to a specific flow is released. The multi-RAT MS can initiate a disassociation process with the secondary system according to the secondary system command message after the disconnection time unless instructed otherwise.

Furthermore, if the disconnection time is used along with a message for re-association with the secondary system or for flow mobility, the disconnection time means the time when access with an AP within the secondary system to and from which data is now transmitted and received in relation to a specific flow is released. The multi-RAT MS can initiate a re-association process with a target AP within the secondary system according to the secondary system command message after the disconnection time unless instructed otherwise.

Examples in which the activation time is used along with each management message are disclosed.

First, if the activation time is used along with a management message for association with the secondary system, the activation time means the time when the transmission and reception of data to and from the secondary system in relation to a specific flow are initiated. In this case, the activation time is set to the time after the time that is enough for the multi-RAT MS to perform an association process with the secondary system. Furthermore, when the activation time is used in a secondary system command message for association with the secondary system, the activation time can have the same value as the above-described disconnection time. In this case, the multi-RAT MS means that the transmission and reception of data to and from the secondary system can be started on the time when association with a system to and from which data is being transmitted and received is released.

Furthermore, if the activation time is used along with a management message for disassociation with the secondary system, the activation time means the time when the transmission and reception of data to and from the primary system in relation to a specific flow are initiated. In this case, the activation time is set to the time after the time that is enough for the multi-RAT MS to perform the disassociation process.

Furthermore, if the activation time is used along with a management message for re-association with the secondary system, the activation time means the time when the transmission and reception of data to and from a new AP within the secondary system in relation to a specific flow are initiated. In this case, the activation time is set to the time after the time that is enough for the multi-RAT MS to perform the re-association process within the new AP within the secondary system.

As an operation method of the secondary system, for example, a method of the multi-RAT MS sending data, being transmitted through RAT with which association is now set up, through another RAT seamlessly is disclosed.

Figure 6:
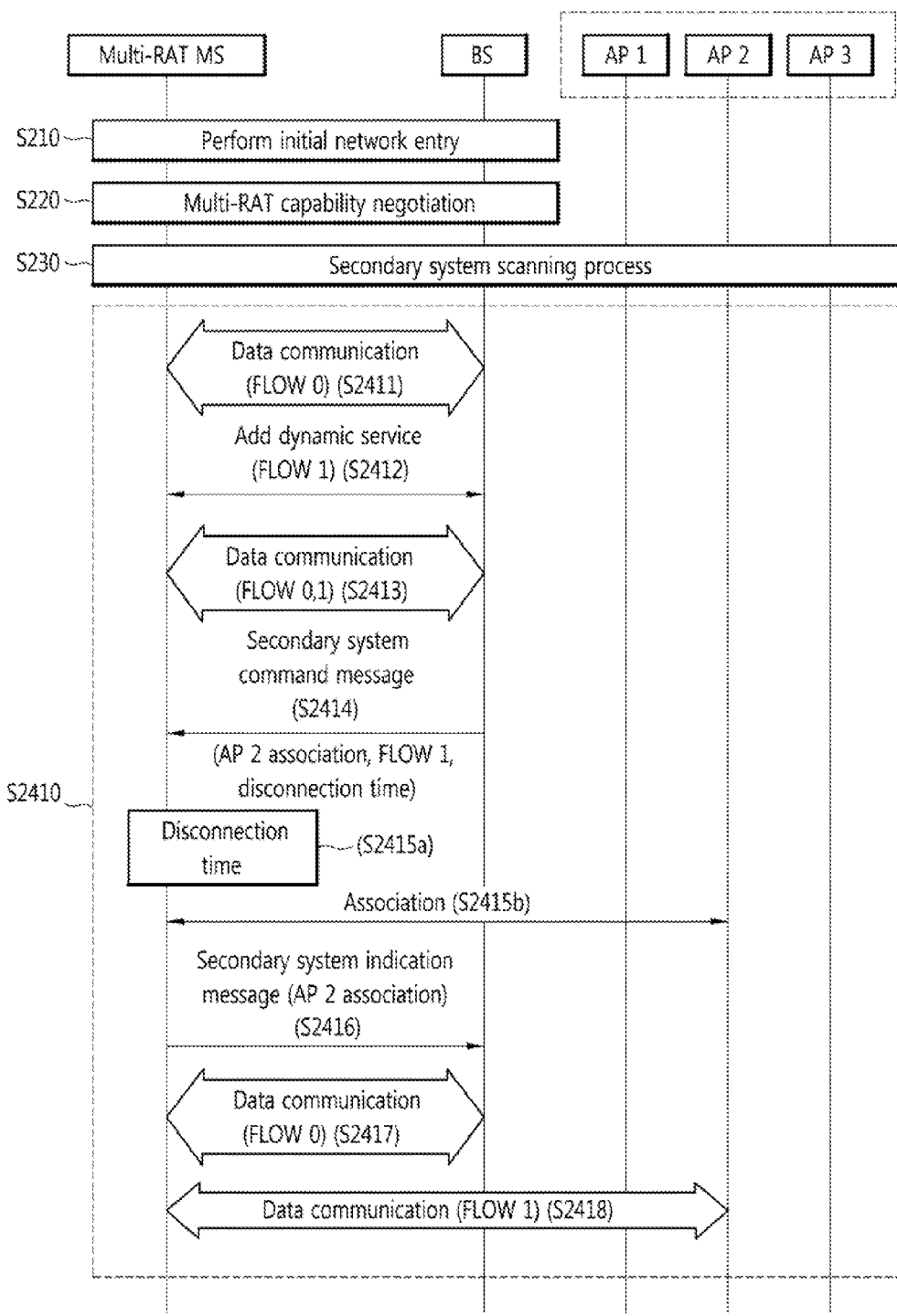
FIG. 6 is an exemplary flowchart in which an association process with the secondary system is performed by using a disconnection time in an operation method of the secondary system according to an embodiment of the present invention.

There is disclosed a method of the multi-RAT MS providing seamless flow mobility based on a disconnection time while performing an association process with the secondary system with reference to FIG. 6. FIG. 6 is an exemplary flowchart in which an association process with the secondary system is performed by using a disconnection time in an operation method of the secondary system according to an embodiment of the present invention.

S210 to S230 are the same as the contents of FIG. 2, thus a description thereof is omitted, and only a step S2410 corresponding to a detailed operation method of the secondary system is disclosed in detail below.

The multi-RAT MS has set up association with the base station so that it transmits and receives data, corresponding to a flow #0, to and from the base station (S2411).

Next, the multi-RAT MS performs a dynamic service addition process (S2412) so that the multi-RAT MS is configured to additionally transmit and receive data corresponding to a flow #1 (S2413).

Next, the base station sends a secondary system command message (S2414). The system command message can include a disconnection time for the data corresponding to the flow #1 along with a management command that instructs an association process with an AP 2 to be performed. The disconnection time indicates a point of time at which the association for the data corresponding to the flow #1, being transmitted and received to and from the base station, is released.

Next, when the disconnection time is reached, the multi-RAT MS releases the association for the transmission and reception of the data corresponding to the flow #1 to and from the base station (S2415a). At this time, the base station stops the transmission of downlink data corresponding to the flow #1 to the multi-RAT MS on the disconnection time, and the multi-RAT MS performs the association process with the AP 2 of the secondary system according to the management command included in the received secondary system command message (S2415b).

Next, the multi-RAT MS sends a secondary system indication message, including a result of the execution of the association process with the AP 2 of the secondary system, to the base station (S2416).

Next, the multi-RAT MS can perform a process of transmitting and receiving the data corresponding to the flow #0 to and from the base station (S2417) and a process of transmitting and receiving the data corresponding to the flow #1 to and from the AP 2 (S2418).

Figure 7:
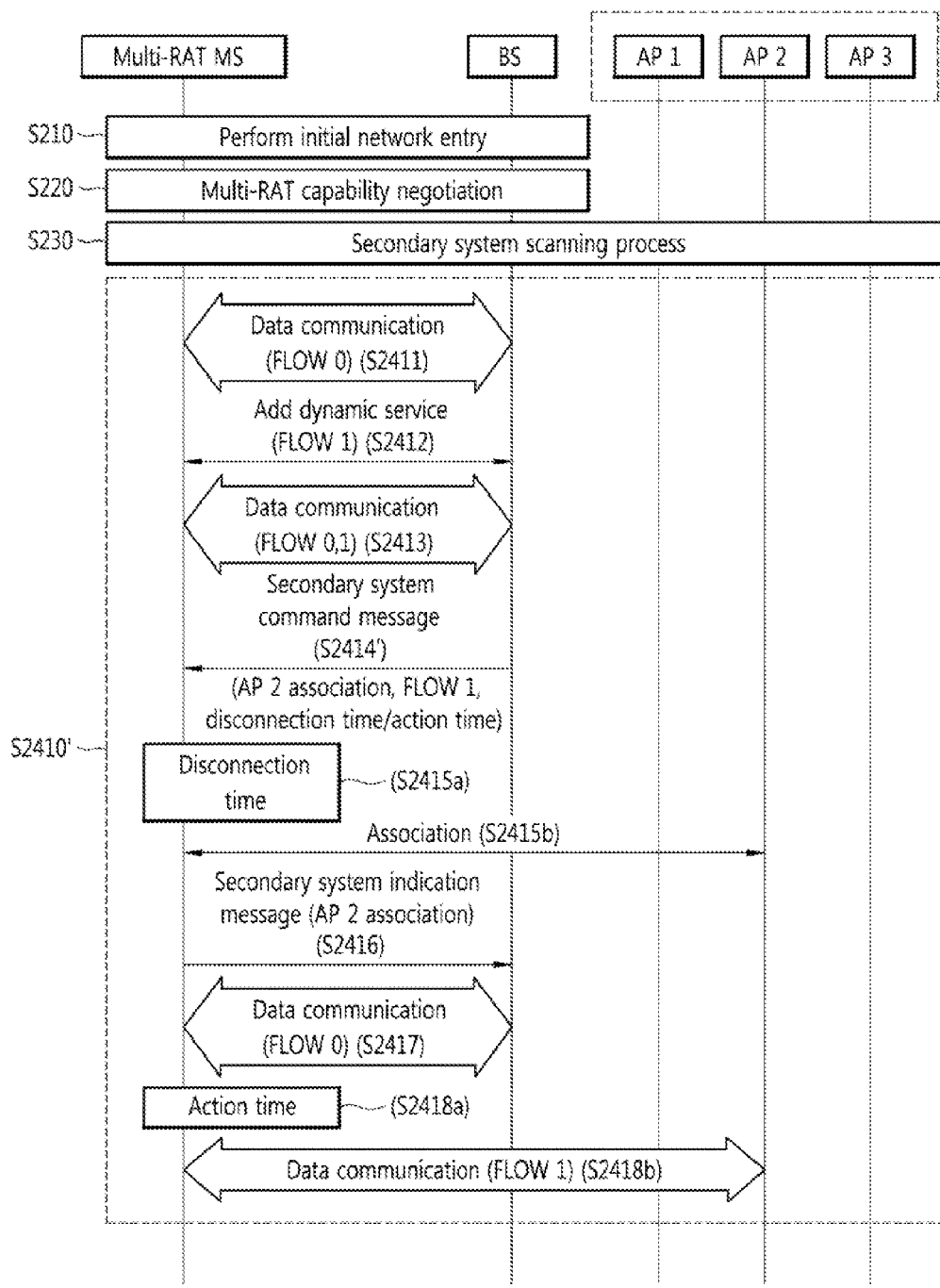
FIG. 7 is an exemplary flowchart in which an association process with the secondary system is performed by using a disconnection time and an activation time in an operation method of the secondary system according to an embodiment of the present invention.

There is disclosed a method of the multi-RAT MS providing seamless flow mobility based on a disconnection time and an activation time while performing an association process with the secondary system with reference to FIG. 7. FIG. 7 is an exemplary flowchart in which an association process with the secondary system is performed by using a disconnection time and an activation time in an operation method of the secondary system according to an embodiment of the present invention.

S210 to S230 are the same as the contents of FIG. 2, and a step S2410' corresponding to a detailed operation method of the secondary system is the same as the step S2410 described with reference to FIG. 6 other than some steps to be described later. Accordingly, a detailed description of the same steps as the above-described steps is omitted.

First, the multi-RAT MS has set up association with the base station so that it transmits and receives data, corresponding to a flow #0, to and from the base station (S2411). Next, the multi-RAT MS performs a dynamic service addition process (S2412) so that the multi-RAT MS is configured to additionally transmit and receive data corresponding to a flow #1 (S2413).

Next, the base station sends a secondary system command message (S2414'). The system command message can include a disconnection time and an activation time for the data corresponding to the flow #1 along with a management command that instructs an association process with an AP 2 to be performed. The disconnection time indicates a point of time at which the association for the data corresponding to the flow #1, being transmitted and received to and from the base station, is released, and the activation time indicates a point of time at which the transmission and reception of the data corresponding to the flow #1 to and from the AP 2 are initiated.

Accordingly, when the disconnection time is reached, the multi-RAT MS releases the association for the transmission and reception of the data corresponding to the flow #1 to and from the base station (S2415a) and performs the association process with the AP 2 of the secondary system according to the management command included in the received secondary system command message (S2415b).

Next, the multi-RAT MS sends a secondary system indication message, including a result of the execution of the association process with the AP 2 of the secondary system, to the base station (S2416).

Next, the multi-RAT MS transmits and receives the data corresponding to the flow #0 to and from the base station (S2417). When the activation time is reached (2418a), the multi-RAT MS initiates the transmission and reception of the data corresponding to the flow #1 to and from the AP 2 (S2418b).

Figure 8:
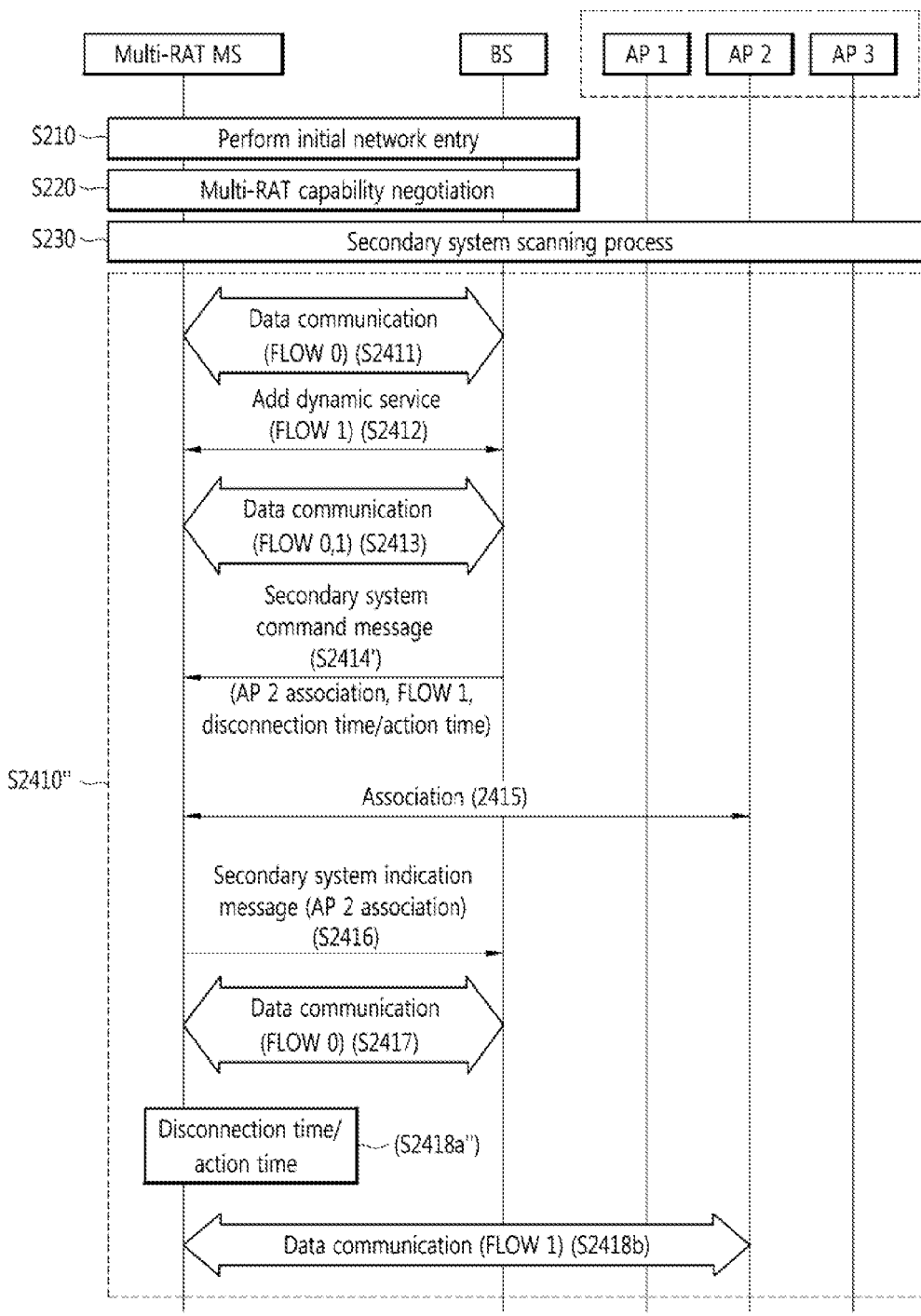
FIG. 8 is an exemplary flowchart in which an association process with the secondary system is performed by using a disconnection time and an activation time in an operation method of the secondary system according to an embodiment of the present invention.

There is disclosed a method of the multi-RAT MS providing seamless flow mobility based on a disconnection time and an activation time while performing an association process with the secondary system according to another embodiment of the present invention with reference to FIG. 8. FIG. 8 is an exemplary flowchart in which an association process with the secondary system is performed by using a disconnection time and an activation time in an operation method of the secondary system according to an embodiment of the present invention.

S210 to S230 are the same as the contents of FIG. 2, and a step S2410" corresponding to a detailed operation method of the secondary system is the same as the step S2410' described with reference to FIG. 7 other than some steps to be described later. Accordingly, a detailed description of the same steps as the above-described steps is omitted.

The step S2410" corresponding to the operation method of the secondary system of FIG. 8 corresponds to a case where the disconnection time and the activation time included in the secondary system command message received by the multi-RAT MS at the step S2414' indicate the same point of time.

Accordingly, when the disconnection time and the activation time included in the secondary system command message reach the same point of time (S2418"), the multi-RAT MS can release the association with the base station for the transmission and reception of the data corresponding to the flow #1 and immediately initiate the transmission and reception of the data corresponding to the flow #1 to and from the AP 2 (S2418b).

Figure 9:
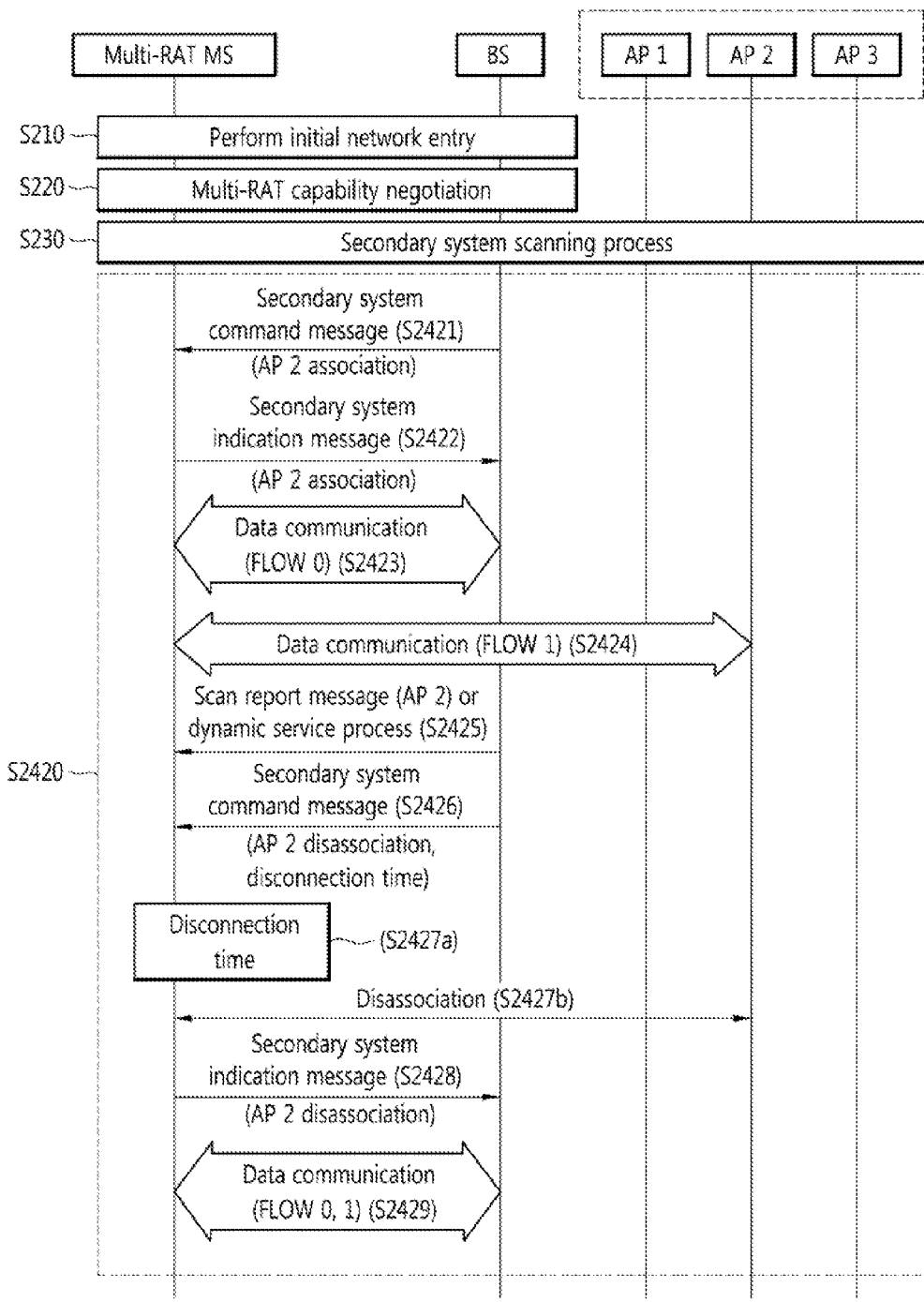
FIG. 9 is an exemplary flowchart in which a disassociation process with the secondary system is performed by using a disconnection time in an operation method of the secondary system according to an embodiment of the present invention.

Hereinafter, there is disclosed a method of the multi-RAT MS providing seamless flow mobility based on a disconnection time while performing a disassociation process with the secondary system with reference to FIG. 9. FIG. 9 is an exemplary flowchart in which a disassociation process with the secondary system is performed by using a disconnection time in an operation method of the secondary system according to an embodiment of the present invention.

S210 to S230 are the same as the contents of FIG. 2, thus a detailed description thereof is omitted, and a step S2420 corresponding to the detailed operation method of the secondary system is disclosed in detail.

The multi-RAT MS receives a secondary system command message, instructing an association process with an AP 2 to be performed, from the base station (S2421) and sends a secondary system indication message, including a result of the execution of the association process with the AP 2, to the base station as a response to the secondary system command message (S2422). Next, the multi-RAT MS sets up an association relationship with the base station for the transmission and reception of data corresponding to a flow #0 (S2423) and sets up an association relationship with the AP 2 for the transmission and reception of data corresponding to a flow #1 (S2424).

Next, the multi-RAT MS sends a result of a check on an access state with the AP 2 or a data transmission and reception state to the base station (S2425). Next, the base station can determine to release the association between the multi-RAT MS and the AP 2 based on a result of the check on the AP 2. The result of the check on the AP 2 can be transferred to the base station through a scan report message or a DSx process (AAI_DSx) for the AP 2.

Next, the base station sends a secondary system command message, instructing disassociation from the AP 2, to the multi-RAT MS (S2426). The secondary system command message instructing the disassociation includes a disconnection time, and the disconnection time indicates a point of time at which the association with the AP 2 for the transmission and reception of the data corresponding to the flow #1 is released.

Next, when the disconnection time is reached, the multi-RAT MS releases the association with the AP 2 for the transmission and reception of the data corresponding to the flow #1 (S2427a) and performs a disassociation process with the AP 2 of the secondary system according to the management command included in the received secondary system command message (S2427b).

Next, the multi-RAT MS sends a secondary system indication message, including a result of the execution of the disassociation process with the AP 2 of the secondary system, to the base station (S2428). Next, the multi-RAT MS can perform a process of transmitting and receiving the data corresponding to the flows #0 and #1 to and from the base station (S2429).

Figure 10:
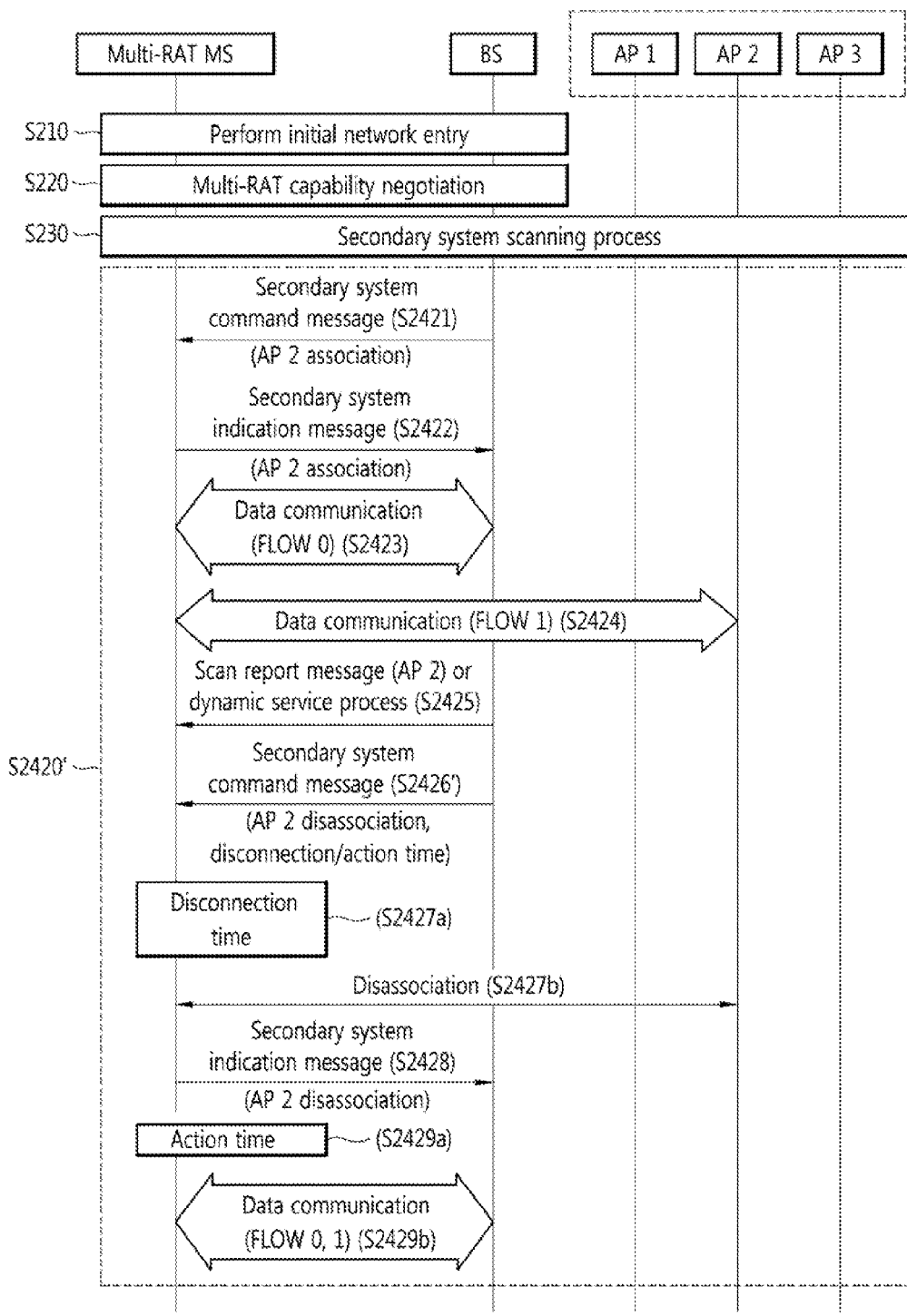
FIG. 10 is an exemplary flowchart in which a disassociation process with the secondary system is performed by using a disconnection time and an activation time in an operation method of the secondary system according to an embodiment of the present invention.

Hereinafter, there is disclosed a method of the multi-RAT MS providing seamless flow mobility based on a disconnection time and an activation time while performing a disassociation process with the secondary system with reference to FIG. 10. FIG. 10 is an exemplary flowchart in which a disassociation process with the secondary system is performed by using a disconnection time and an activation time in an operation method of the secondary system according to an embodiment of the present invention.

S210 to S230 are the same as the contents of FIG. 2, and a step S2420' corresponding to a detailed operation method of the secondary system is the same as the step S2420 described with reference to FIG. 9 other than some steps to be described later. Accordingly, a detailed description of the same steps as the above-described steps is omitted.

The multi-RAT MS receives a secondary system command message, instructing an association process with an AP 2 to be performed, from the base station (S2421) and sends a secondary system indication message, including a result of the execution of the association process with the AP 2, to the base station as a response to the command message (S2422). Next, the multi-RAT MS sets up an association relationship with the base station for the transmission and reception of data corresponding to a flow #0 (S2423) and sets up an association relationship with the AP 2 for the transmission and reception of data corresponding to a flow #1 (S2424).

Next, the multi-RAT MS sends a result of a check on an access state for the AP 2 or on a data transmission and reception state to the base station (S2425).

Next, if the base station determines to release the association between the multi-RAT MS and the AP 2 based on a result of the check, the base station sends a secondary system command message, instructing disassociation from the AP 2, to the multi-RAT MS (S2426'). The secondary system command message instructing the disassociation includes a disconnection time and an activation time. The disconnection time indicates a point of time at which the association with the AP 2 for the transmission and reception of the data corresponding to the flow #1 is released, and the activation time indicates a point of time at which the transmission and reception of the data corresponding to the flow #1 to and from the base station are initiated.

Next, when the disconnection time is reached, the multi-RAT MS releases the association with the AP 2 for the transmission and reception of the data corresponding to the flow #1 (S2427a) and performs a disassociation process with the AP 2 of the secondary system in response to the management command included in the received secondary system command message (S2427b).

Next, the multi-RAT MS sends a secondary system indication message, including a result of the execution of the disassociation process with the AP 2 of the secondary system, to the base station (S2428).

Next, when the activation time is reached (S2429a), the multi-RAT MS can perform a process of transmitting and receiving the data corresponding to the flow #0 and #1 to and from the base station by initiating the transmission and reception of the data corresponding to the flow #1 to and from the base station (S2429b).

Figure 11:
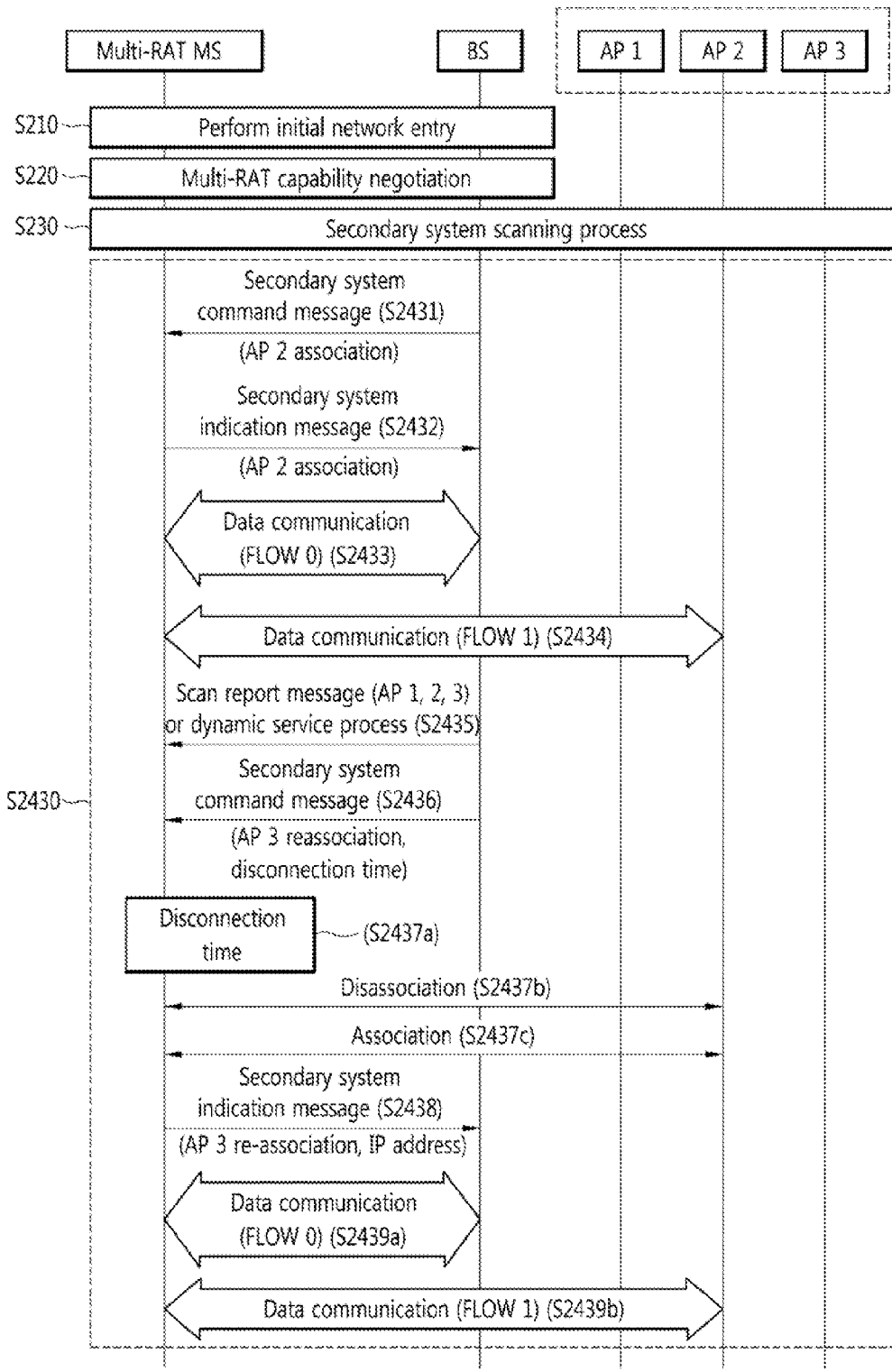
FIG. 11 is an exemplary flowchart in which a re-association process with the secondary system is performed by using a disconnection time in an operation method of the secondary system according to an embodiment of the present invention.

Hereinafter, there is disclosed a method of the multi-RAT MS providing seamless flow mobility based on a disconnection time while performing a re-association process with the secondary system with reference to FIG. 11. FIG. 11 is an exemplary flowchart in which a re-association process with the secondary system is performed by using a disconnection time in an operation method of the secondary system according to an embodiment of the present invention.

S210 to S230 are the same as the contents of FIG. 2, thus a detailed description thereof is omitted, and a step S2430 corresponding to a detailed operation method of the secondary system is disclosed in detail.

First, the base station sends a secondary system command message including a management command that instructs an association process with an AP 2 to be performed (S2431). Next, the multi-RAT MS sends a secondary system indication message, including a result of the execution of the association process with the AP of the secondary system 2, to the base station in response to the secondary system command message (S2432).

Next, the multi-RAT MS sets up an association relationship with the base station for the transmission and reception of data corresponding to a flow #0 (S2433) and sets up an association relationship with the AP 2 for the transmission and reception of data corresponding to a flow #1 (S2434).

Next, the multi-RAT MS sends a result of a check on a communication state with APs, belonging to the secondary system, to the base station (S2435). The result of the check can be a scan report message or a DSx process (AAI_DSx) for an AP 1, the AP 2, and an AP 3 which belong to the secondary system. The base station can determine to change the association with the AP 2 through which the data corresponding to the flow #1 is now being transmitted and received into association with the AP 3 based on the result of the check on the APs belonging to the secondary system.

Next, the base station sends a secondary system command message, instructing a re-association process to the AP 3 to be performed, to the multi-RAT MS (S2436). The secondary system command message instructing the re-association includes a disconnection time, and the disconnection time indicates a point of time at which the association with the AP 2 for the transmission and reception of the data corresponding to the flow #1 is released.

Next, when the disconnection time is reached, the multi-RAT MS releases the association with the AP 2 for the transmission and reception of the data corresponding to the flow #1 (S2437a), performs a disassociation process with the AP 2 of the secondary system according to the management command included in the received secondary system command message (S2437b), and performs an association process with the AP 3 (S2437c).

Next, the multi-RAT MS sends a secondary system indication message, including a result of the execution of the re-association process with the AP 3 of the secondary system, to the base station (S2438). The secondary system indication message can include IP address information used to access the AP 3, and the base station can update the transmission path of the data corresponding to the flow #1 based on the IP address.

Next, the multi-RAT MS sets up an association relationship with the base station for the transmission and reception of the data corresponding to the flow #0 (S2439a) and sets up an association relationship with the AP 3 for the transmission and reception of data corresponding to the flow #1 (S2439b), so that the multi-RAT MS can perform data communication.

Figure 12:
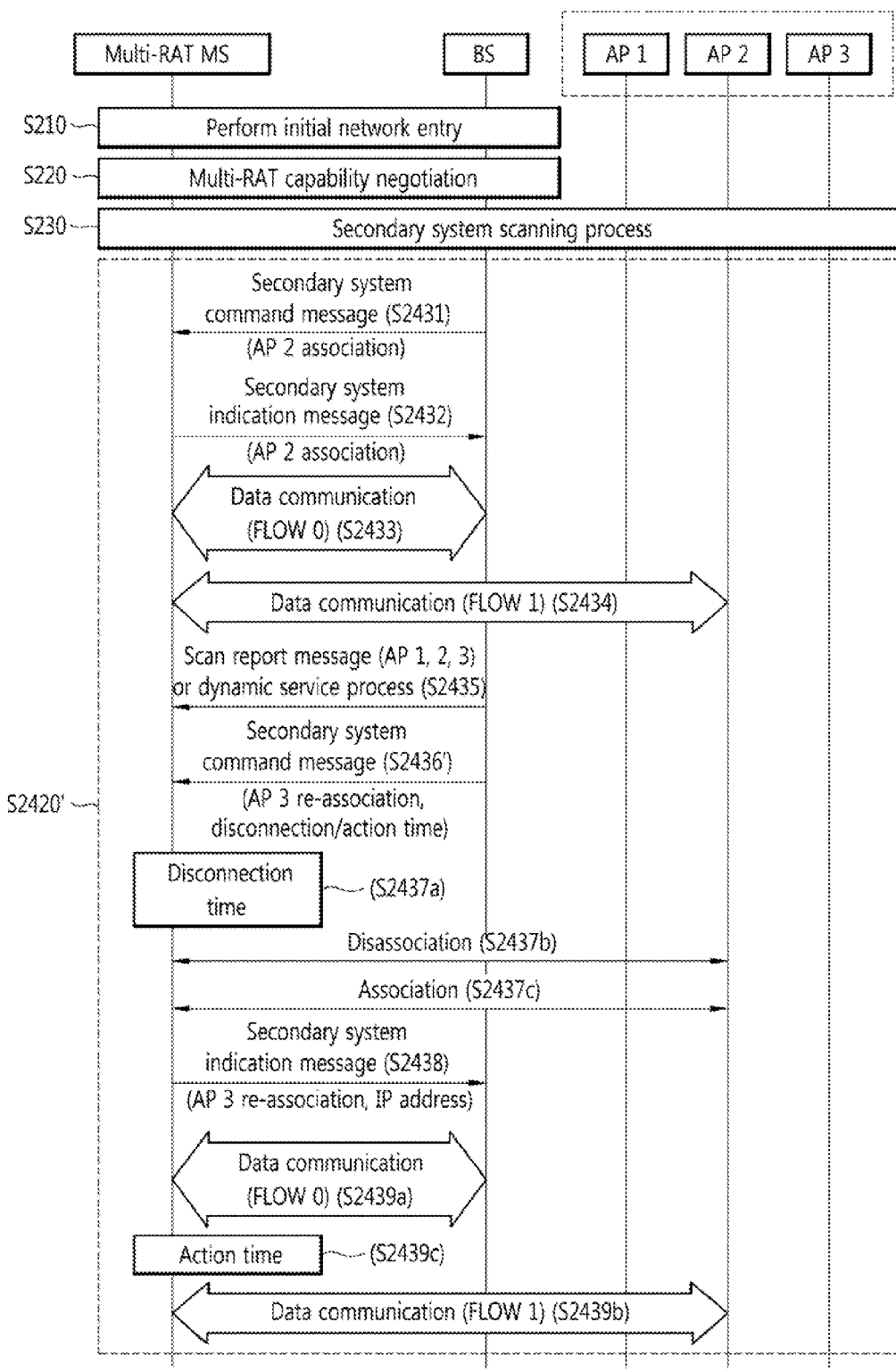
FIG. 12 is an exemplary flowchart in which a re-association process with the secondary system is performed by using a disconnection time and an activation time in an operation method of the secondary system according to an embodiment of the present invention.

There is disclosed a method of the multi-RAT MS providing seamless flow mobility based on a disconnection time and an activation time while performing a re-association process with the secondary system with reference to FIG. 12. FIG. 12 is an exemplary flowchart in which a re-association process with the secondary system is performed by using a disconnection time and an activation time in an operation method of the secondary system according to an embodiment of the present invention.

S210 to S230 are the same as the contents of FIG. 2, and a step S2430' corresponding to a detailed operation method of the secondary system is the same as the step S2430 described with reference to FIG. 11 other than some steps to be described later. Accordingly, a detailed description of the same steps as the above-described steps is omitted.

First, the base station sends a secondary system command message including a management command that instructs an association process with an AP 2 to be performed (S2431). Next, the multi-RAT MS sends a secondary system indication message, including a result of the execution of the association process with the AP 2 of the secondary system, to the base station in response to the secondary system command message (S2432).

Next, the multi-RAT MS sets up an association relationship with the base station the transmission and reception of data corresponding to a flow #0 (S2433) and sets up an association relationship with the AP 2 for the transmission and reception of data corresponding to a flow #1 (S2434).

Next, the multi-RAT MS sends a result of a check on a communication state with APs belonging to the secondary system to the base station (S2435). The result of the check can be a scan report message or the DSx process (AAI_DSx) for an AP 1, the AP 2, and an AP 3 belonging to the secondary system. The base station can determine to change the association with the AP 2 through which the data corresponding to the flow #1 is now being transmitted and received into association with the AP 3 based on the result of the check on the APs belonging to the secondary system.

Next, the base station sends a secondary system command message, instructing a re-association process with the AP 3 to be performed, to the multi-RAT MS (S2436'). The secondary system command message instructing the re-association includes a disconnection time and an activation time. The disconnection time indicates a point of time at which the association with the AP 2 for the transmission and reception of the data corresponding to the flow #1 is released, and the activation time indicates a point of time at which the transmission and reception of the data corresponding to the flow #1 to and from the AP 3 are initiated.

Next, when the disconnection time is reached, the multi-RAT MS releases the association with the AP 2 for the transmission and reception of the data corresponding to the flow #1 (S2437a), performs a disassociation process with the AP 2 of the secondary system in response to a management command included in the received secondary system command message (S2437b), and performs an association process with the AP 3 (S2437c).

Next, the multi-RAT MS sends a secondary system indication message, including a result of the execution of the re-association process with the AP 3 of the secondary system 3, to the base station (S2438). Next, the multi-RAT MS sets up an association relationship with the base station for the transmission and reception of the data corresponding to the flow #0 (S2439a). Next, when the activation time is reached (S2439c), the multi-RAT MS sets up an association relationship with the AP 3 for the transmission and reception of the data corresponding to the flow #1 (S2439b) so that the multi-RAT MS can perform data communication.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 7.

Figure 13:
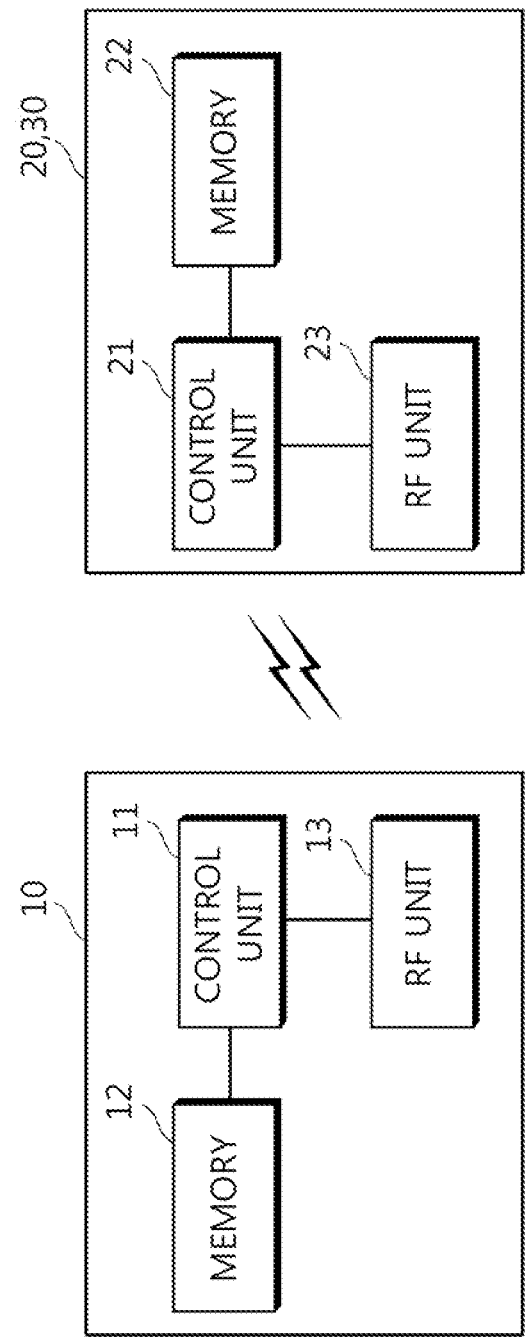
FIG. 13 is a block diagram showing internal structures of an MS and a BS in a wireless access system according to an embodiment of the present invention.

FIG. 13 is a block diagram showing internal structures of an MS and a BS in a wireless access system according to an embodiment of the present invention.

An MS 10 includes a controller 11, a memory 12, and a radio frequency (RF) unit 13.

The MS 10 can be fixed or mobile and can be called another terminology, such as user equipment (UE), a user terminal (UT), a subscriber station (SS), a wireless device, or an advanced mobile station (AMS). Furthermore, the MS includes the multi-RAT MS.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20, 30 includes a controller 21, a memory 22, and an RF unit 23.

Here, the base station 20, 30 commonly refers to a fixed station communicating with the MS, and the base station can be called another terminology, such as a NodeB, a base transceiver system (BTS), or an access point. One or more cell can be present in one base station.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method of transmitting and receiving data in a wireless communication system, the method comprising:
   transmitting and receiving data, by a terminal, corresponding to a service flow, to and from a first base station,
   wherein the terminal is a multi-radio access technology (Multi-RAT) terminal capable of performing a communication with two heterogeneous networks at same time, and
   wherein the first base station included within one of the two heterogeneous networks supports a long term evolution-advanced (LTE-A) scheme;
   adding a new service flow through a dynamic service process with the first base station;
   transmitting and receiving data, corresponding to the service flow and the new service flow, to and from the first base station,
   wherein the data corresponding to the service flow and the data corresponding to the added new service flow are simultaneously transmitted and received until the terminal receives a first secondary system command message from the first base station;
   receiving the first secondary system command message, instructing an association with the second base station for the new service flow, from the first base station,
   wherein the second base station is a selected access point (AP) among a plurality of access points (APs),
   wherein the second base station included within another one of the two heterogeneous networks supports an IEEE 802.16m scheme,
   wherein the first secondary system command message includes first disconnection time information indicating a disconnection time from the first base station for the new service flow,
   wherein the first secondary system command message further includes a management command indicating an activation time of an association for the new service flow, and
   wherein the disconnection time and the activation time indicates a same point of time;
   performing an association procedure with the selected AP among the plurality of APs according to the management command included in the first secondary system command message;
   transmitting a first secondary system indication message, indicating a success of the association of the new service flow with the selected AP among the plurality of APs, to the first base station;
   transmitting and receiving the data, corresponding to the service flow, to and from the first base station; and
   when the disconnection time and the activation time included in the first secondary system command message reach the same point of time,
   releasing the association with the first base station for the new service flow based on the first disconnection time information; and
   immediately transmitting and receiving the data corresponding to the new service flow to and from the second base station based on the management command.

2. The method of claim 1, further comprising:
   receiving a second secondary system command message, instructing disassociation with the second base station of the new service flow, from the first base station,
   wherein the second secondary system command message includes second disconnection time information indicating a disconnection time from the second base station for the new service flow;
   releasing the association with the second base station based on the second disconnection time information; and
   transmitting and receiving the data corresponding to the new service flow to and from the first base station.

3. The method of claim 2, further comprising:
   transmitting a second secondary system indication message, indicating the disassociation with the second base station of the new service flow, to the first base station.

4. The method of claim 1, further comprising:
   receiving a third secondary system command message, instructing re-association of the new service flow with another second base station other than the second base station,
   wherein the third secondary system command message includes
      third disconnection time information indicating a disconnection time from the second base station of the new service flow, and
      third action time information indicating a beginning time of an association with the another second base station of the new service flow;
   releasing the association of the new service flow with the second base station based on the third disconnection time information;
   performing an association procedure of the new service flow with the another second base station based on the third action time information; and
   transmitting and receiving the data corresponding to the new service flow to and from the another second base station.

5. The method of claim 4, further comprising:
   transmitting a third secondary system indication message, indicating a success of the association of the new service flow with the another second base station, to the first base station.

6. The method of claim 4, further comprising:
   transmitting a scan report message, reporting a result of scanning on the another second base station, to the first base station.

7. A terminal for transmitting and receiving data in a wireless communication system, the terminal comprising:
   a radio communication unit configured to transmit and receive radio signals to and from an outside; and
   a control unit connected to the radio communication unit, and configured to:
      transmit and receive data, corresponding to a service flow, to and from the first base station,
      wherein the terminal is a multi-radio access technology (Multi-RAT) terminal capable of performing a communication with two heterogeneous networks at same time, and wherein the first base station included within one of the two heterogeneous networks supports a long term evolution-advanced (LTE-A) scheme;
add a new service flow through a dynamic service process with the first base station;
transmit and receive data, corresponding to the service flow and the new service flow, to and from the first base station,
wherein the data corresponding to the service flow and the data corresponding to the added new service flow are simultaneously transmitted and received until the terminal receives a first secondary system command message from the first base station;
receive the first secondary system command message, instructing an association with the second base station for the new service flow, from the first base station,
wherein the second base station is a selected access point (AP) among a plurality of access points (APs),
wherein the second base station included within another one of the two heterogeneous networks supports an IEEE 802.16m scheme,
wherein the first secondary system command message includes disconnection time information indicating a disconnection time from the first base station for the new service flow,
wherein the first secondary system command message further includes a management command indicating an activation time of an association for the new service flow, and
wherein the disconnection time and the activation time indicates a same point of time;
perform an association procedure with the selected AP among the plurality of APs according to the management command included in the first secondary system command message;
transmit a first secondary system indication message, indicating a success of the association of the new service flow with the selected AP among the plurality of APs, to the first base station;
transmit and receive the data, corresponding to the service flow, to and from the first base station; and
when the disconnection time and the activation time included in the first secondary system command message reach the same point of time,
  release the association with the first base station for the new service flow based on the first disconnection time information, and
  immediately transmit and receive the data corresponding to the new service flow to and from the second base station based on the management command.

* * * * *